US012397272B2

(12) United States Patent
Carlson et al.

(10) Patent No.: US 12,397,272 B2
(45) Date of Patent: Aug. 26, 2025

(54) MULTI-AXIS MIXING

(71) Applicant: Radia, Plymouth, MN (US)

(72) Inventors: Stephen John Carlson, Shorewood, MN (US); Ross Robert Neal, Wayzata, MN (US); Erik John Sundine, Monticello, MN (US)

(73) Assignee: Radia, Plymouth, MN (US)

( * ) Notice: Subject to any disclaimer, the term of this patent is extended or adjusted under 35 U.S.C. 154(b) by 994 days.

(21) Appl. No.: 17/354,082

(22) Filed: Jun. 22, 2021

(65) Prior Publication Data

US 2022/0023811 A1 Jan. 27, 2022

Related U.S. Application Data

(60) Provisional application No. 63/055,434, filed on Jul. 23, 2020.

(51) Int. Cl.

| | |
|---|---|
| ***B01F 29/10*** | (2022.01) |
| ***B01F 29/00*** | (2022.01) |
| ***B01F 35/32*** | (2022.01) |
| ***B01F 35/42*** | (2022.01) |
| *B01F 35/30* | (2022.01) |

(52) U.S. Cl.

CPC ........ *B01F 29/40363* (2022.01); *B01F 29/10* (2022.01); *B01F 29/40353* (2022.01); *B01F 35/3204* (2022.01); *B01F 35/423* (2022.01); *B01F 35/425* (2022.01); *B01F 2035/352* (2022.01); *B01F 2035/353* (2022.01)

(58) Field of Classification Search

CPC ........................... B01F 29/10; B01F 29/40353

USPC ......................................... 366/213, 217, 605

See application file for complete search history.

(56) References Cited

U.S. PATENT DOCUMENTS

| | | | | |
|---|---|---|---|---|
| 1,292,127 A | | 1/1919 | Stevens | |
| 1,462,917 A | | 7/1923 | Miller | |
| 2,288,440 A | | 6/1942 | Evans | |
| 2,650,805 A | | 9/1953 | Schaefer | |
| 3,542,344 A | * | 11/1970 | Oberhauser ........... | B01F 35/421 366/202 |

(Continued)

FOREIGN PATENT DOCUMENTS

| | | |
|---|---|---|
| CA | 1246053 A | 12/1988 |
| EP | 1595593 A1 | 11/2005 |

(Continued)

OTHER PUBLICATIONS

"Dispensers", downloaded from https://emea.fast-fluid.com/products on May 21, 2021, 7 pages.

(Continued)

*Primary Examiner* — David L Sorkin

(57) ABSTRACT

A multi-axis mixing apparatus is disclosed that includes a housing and a controller operatively connected to a first motor and a second motor. The apparatus includes a frame supporting the first motor configured to selectively rotate a rotatable assembly. The rotatable assembly supports and provides an operative connection to the second motor configured to selectively rotate a rotatable sub-assembly. The rotatable sub-assembly includes a mechanism configured to receive and hold a container containing contents to be mixed, and the controller is configured to independently operate the first and second motors to mix the contents.

20 Claims, 18 Drawing Sheets

(56) References Cited

U.S. PATENT DOCUMENTS 3,679,184 A * 7/1972 Woodham ............... B01F 29/80 206/219
3,706,443 A 12/1972 Oberhauser
4,235,553 A 11/1980 Gall
4,281,936 A 8/1981 Schotter et al.
4,445,782 A 5/1984 Sparrow, Jr.
4,446,779 A 5/1984 Hubbard et al.
5,116,134 A * 5/1992 Edwards ................. B01F 29/40 366/208
5,231,886 A * 8/1993 Quirk ...................... B06B 1/166 74/609
5,261,744 A 11/1993 Brunn
5,352,037 A 10/1994 Jouvin
5,383,163 A 1/1995 Brunn
5,660,467 A * 8/1997 Mineo ..................... B01F 27/80 366/279
5,857,513 A * 1/1999 Calhoun ................. B22C 11/10 366/155.2
6,413,451 B1 7/2002 Kawahara et al.
6,767,126 B2 7/2004 Miller
6,953,279 B2 10/2005 Midas et al.
7,059,763 B2 6/2006 Sordelli et al.
7,097,348 B2 8/2006 Miller
7,165,879 B2 1/2007 Midas et al.
7,284,901 B2 10/2007 Midas et al.
7,311,437 B2 12/2007 Midas et al.
7,325,969 B2 2/2008 Kretzschmar et al.
7,344,300 B2 3/2008 Midas et al.
7,604,987 B2 * 10/2009 Hutmacher ............ C12M 21/08 366/217
7,654,730 B2 2/2010 Marshall et al.
7,780,339 B2 8/2010 Johnson et al.
7,819,577 B2 * 10/2010 Greco ................. B01F 35/2209 366/605
7,942,571 B2 5/2011 Midas et al.
2005/0088911 A1 * 4/2005 Sordelli ................ B01F 35/423 366/217
2006/0077754 A1 * 4/2006 Bressani ................. B01F 29/10 366/217
2007/0002681 A1 1/2007 Vanderbilt et al.
2007/0211561 A1 * 9/2007 Page ..................... B01F 35/423 366/605
2012/0294110 A1 11/2012 Airaksinen
2014/0219049 A1 * 8/2014 Airaksinen ........... B01F 35/423 366/209
2016/0144324 A1 * 5/2016 Jones ...................... B01F 29/33 366/213
2017/0320026 A1 * 11/2017 Kruit ..................... B01F 35/211

FOREIGN PATENT DOCUMENTS

IT MI20042508 A1 3/2005
WO 9002002 A1 3/1990
WO 2018184959 A1 10/2018

OTHER PUBLICATIONS

"Our Product Range", downloaded from http://merris-international.com/products/ on May 26, 2021, 1 page.
"Mixer", downloaded from https://www.santint.com/products/decorative-paint/mixer/gyroscopic-mixer/ on May 26, 2021. 2 pages.
"Chameleon—The Future Now", downloaded from https://www.chameleon.ie/start/index.php?a=index on May 26, 2021, 2 pages.
"Gyroscopic Mixer—Automatic Gyroscopic Mixer", downloaded from https://www.cabocolor.com/index.php/en/products/mixer on May 26, 2021, 2 pages.

* cited by examiner

MULTI-AXIS MIXING

CROSS-REFERENCE TO RELATED APPLICATIONS

This application claims the benefit of U.S. Provisional Patent Application No. 63/055,434, filed Jul. 23, 2020, the entire contents of which are incorporated herein by reference in their entirety.

BACKGROUND

The present invention is directed to mixing, and is more specifically directed to multi-axis mixing, related methods, and features thereof.

It is frequently desirable to mix various substances. For example, generally liquid and/or semi-liquid with solids therein such as paint frequently start as various separate substances or colors that are then mixed into a desired mixture, such as to achieve a certain color, tone, hue, reflectivity, and the like. In order to promote more complete and/or more even mixing, various mixers can utilize more than one independent movement during mixing.

At present, mixers are complex. Often, mixers include undesirable components that can require frequent maintenance and/or repairs. Furthermore, containers with contents to be mixed are frequently heavy and/or bulky, and can be difficult to insert and/or remove from the mixing apparatus.

Therefore, there is a need for an improved mixing apparatus and related methods that provides a simplified, more reliable, and easier-to-use mixing and related container handling experience.

SUMMARY

The present invention overcomes shortcomings of the prior art by introducing multi-axis mixing with improved mixing, extraction, electrical, and mechanical properties.

According to a first embodiment of the present disclosure, a multi-axis mixing apparatus is disclosed. According to the first embodiment, the apparatus includes a housing and a controller operatively connected to a first motor and a second motor. The apparatus also includes a frame supporting the first motor configured to selectively rotate a rotatable assembly. Also according to the first embodiment, the rotatable assembly supports and provides an operative connection to the second motor configured to selectively rotate a rotatable sub-assembly. Also according to the first embodiment, the rotatable sub-assembly includes a mechanism configured to receive and hold a container containing contents to be mixed, and the controller is configured to independently operate the first and second motors to mix the contents. Also disclosed is a method of mixing according to the first embodiment. Yet further disclosed is a paint mixer including the apparatus of the first embodiment, where the container is a paint container and the contents include paint to be mixed.

According to a second embodiment of the present disclosure, a multi-axis mixing apparatus is disclosed. According to the second embodiment, the apparatus includes a housing and a controller operatively connected to at least a first motor configured to selectively rotate a rotatable assembly. Also according to the second embodiment, the rotatable assembly supports a rotatable sub-assembly. Also according to the second embodiment, the rotatable sub-assembly includes a mechanism configured to receive and hold a container containing contents to be mixed, and an extractor mechanism is configured to displace the container relative to the sub-assembly for removal of the container.

According to a third embodiment of the present disclosure, a multi-axis mixing apparatus is disclosed. According to the third embodiment, the apparatus includes a housing and a controller operatively connected to at least a first motor configured to selectively rotate a rotatable assembly. Also according to the third embodiment, the rotatable assembly supports a rotatable sub-assembly. Also according to the third embodiment, the rotatable sub-assembly includes a mechanism configured to receive and hold a container containing contents to be mixed, and the sub-assembly includes at least one magnet configured to attract and hold a handle of the container.

DETAILED DESCRIPTION

Disclosed is an easy-to-use, multi-axis mixing apparatus and related methods that use multi-axis, gyroscopic motion to mix contents in containers ranging from roughly a quart or less to larger than five U.S. gallons. Disclosed embodiments also utilize improved operative connections, simpler and improved mechanical operation, and more reliable operation. Disclosed embodiments yet further provide for improved and assisted extraction of a container from the mixing apparatus and other improvements to container handling.

Figure 1:
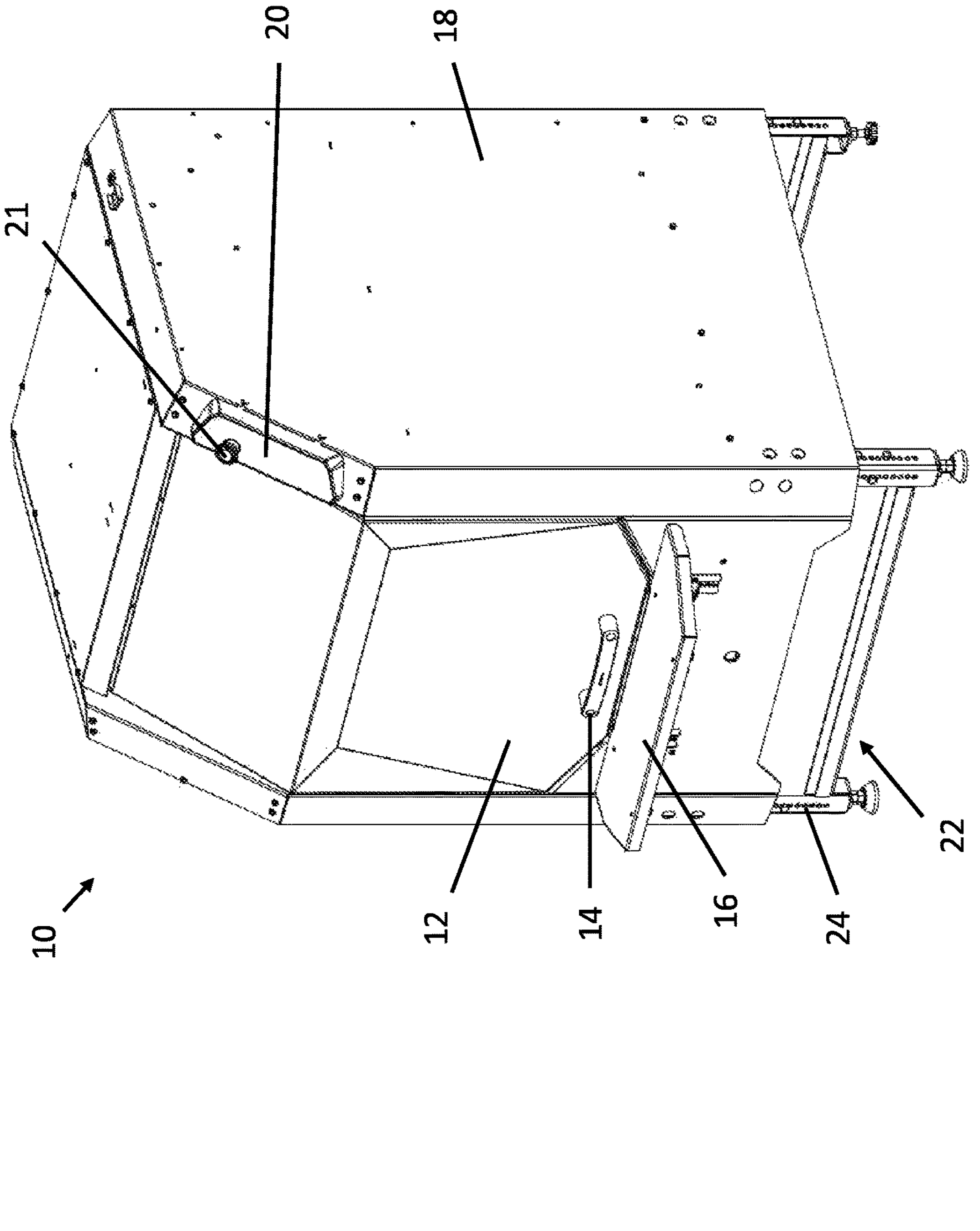
FIG. 1 is an isometric view of a multi-axis mixing apparatus with a door in a closed position, according to various embodiments.
Figure 2:
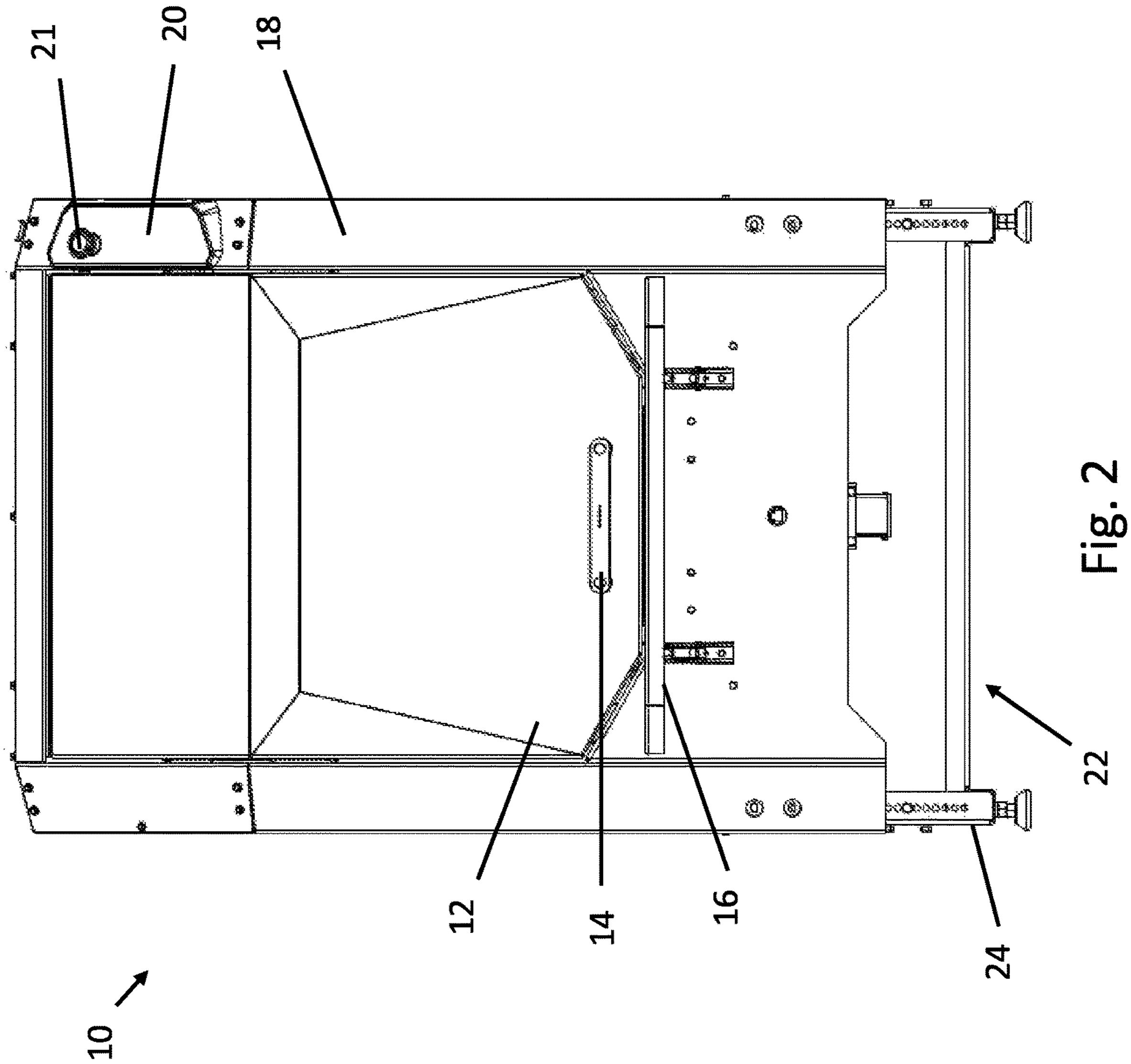
FIG. 2 is a front view of the multi-axis mixing apparatus of FIG. 1, according to various embodiments.
Figure 3:
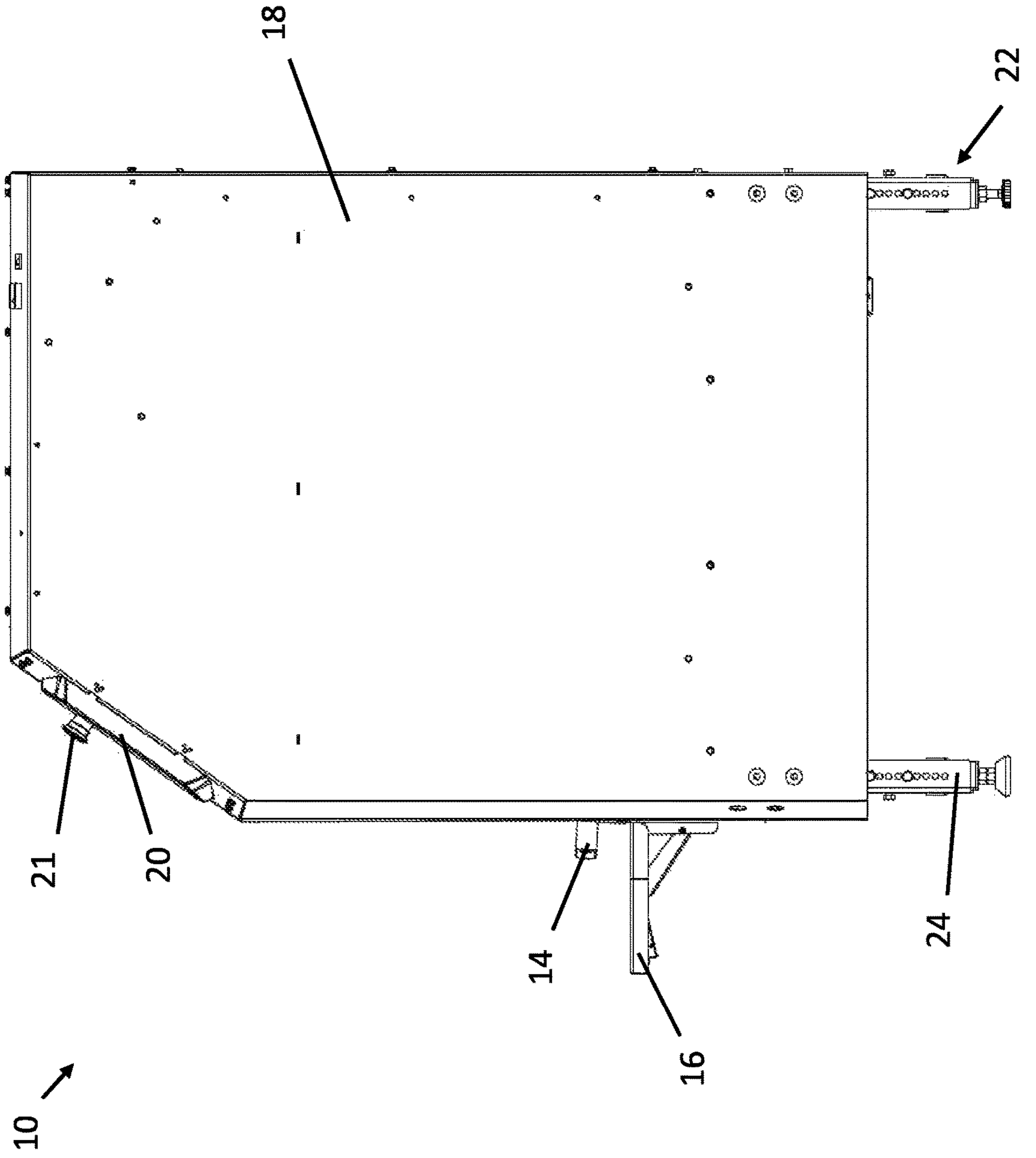
FIG. 3 is a side view of the multi-axis mixing apparatus of FIG. 1, according to various embodiments.
Figure 4:
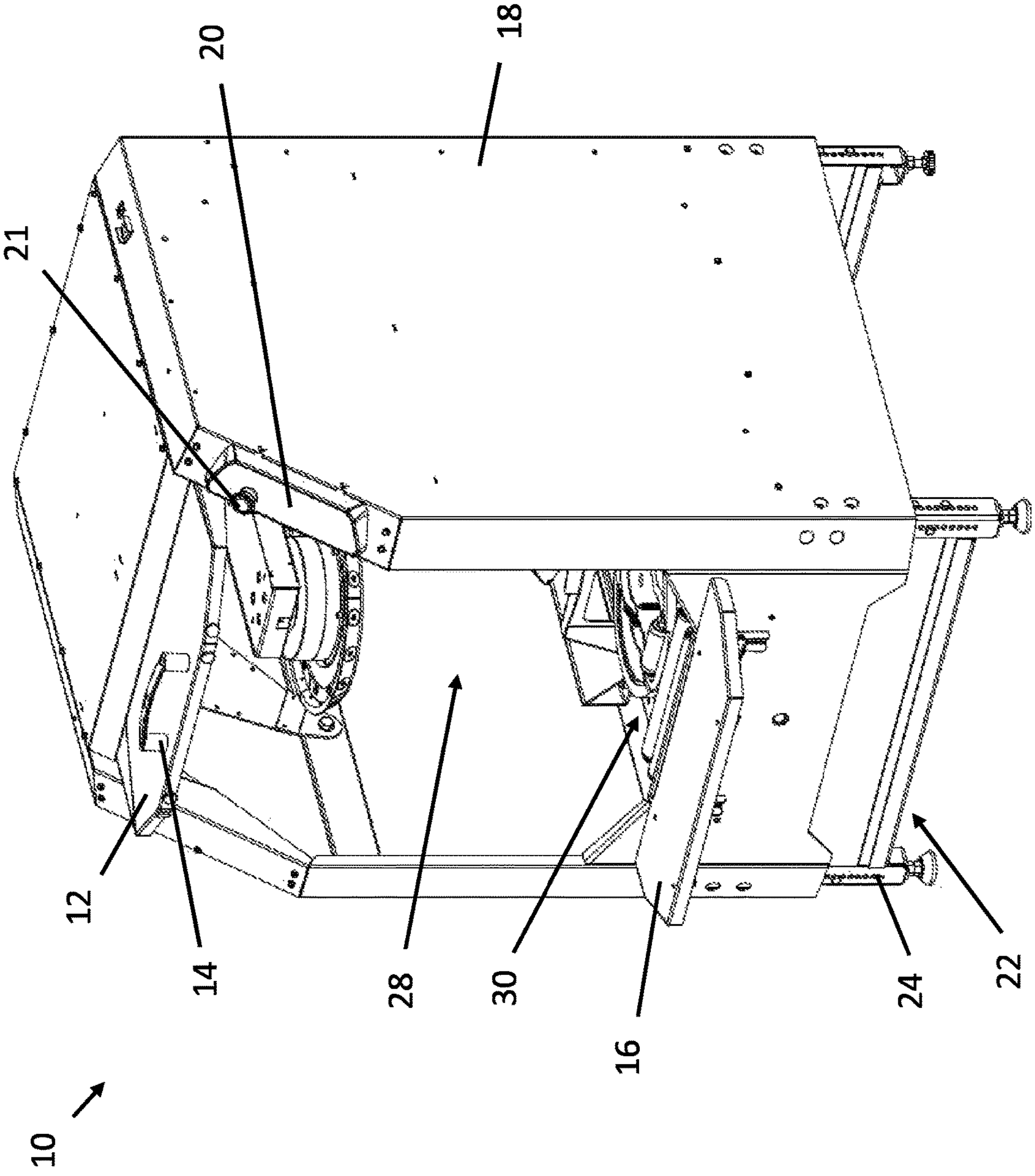
FIG. 4 is an isometric view of the multi-axis mixing apparatus of FIG. 1 with the door in an open position, according to various embodiments.
Figure 5:
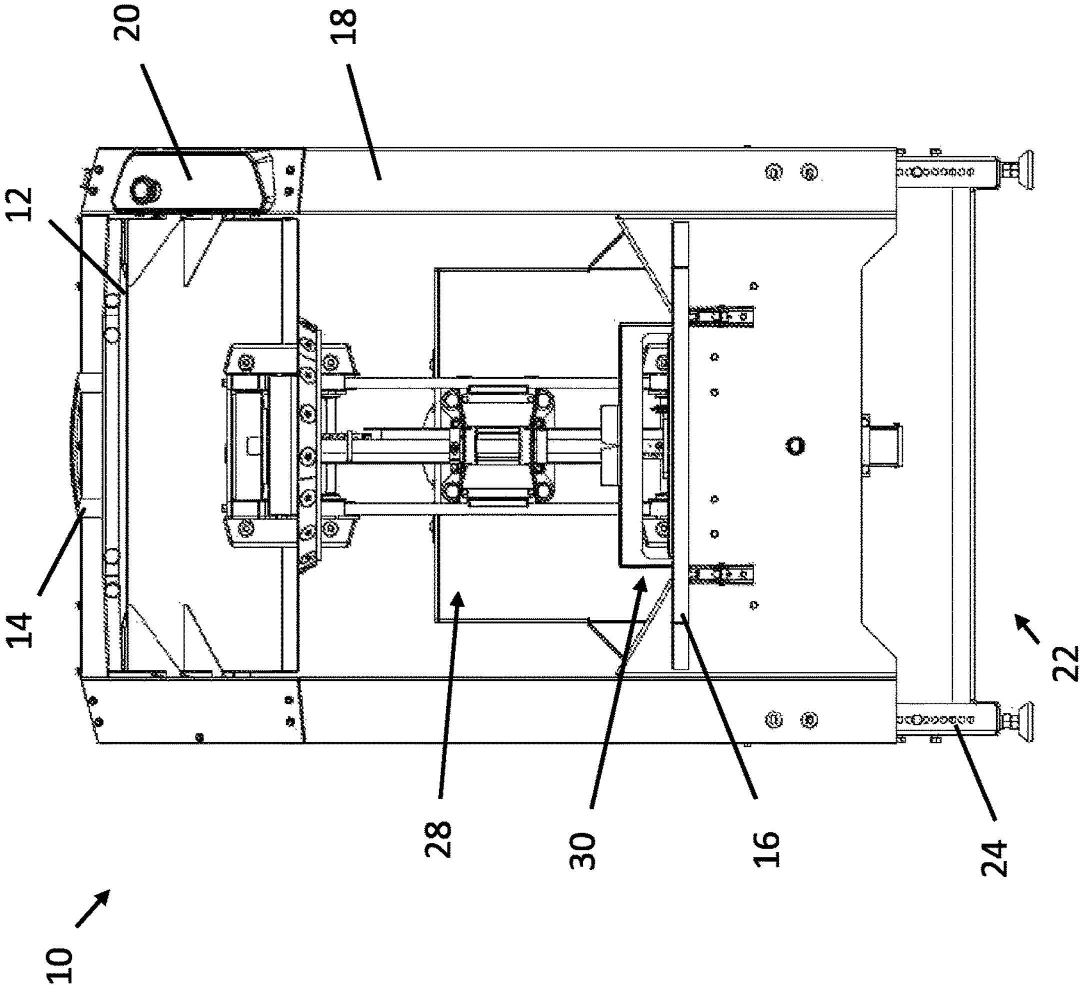
FIG. 5 is a front view of the multi-axis mixing apparatus of FIG. 1 with the door in the open position, according to various embodiments.
Figure 6:
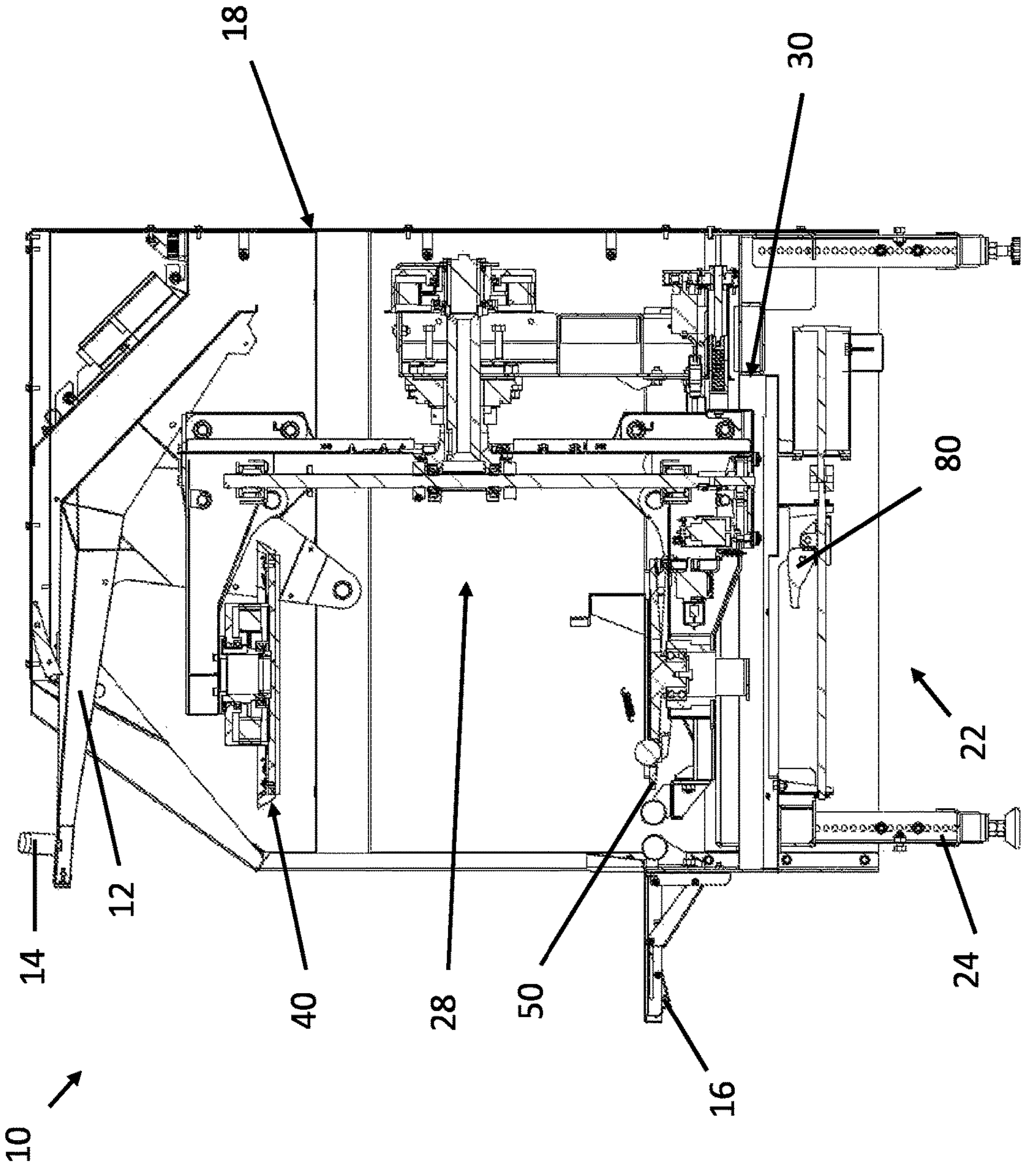
FIG. 6 is a cross-sectional side view of the multi-axis mixing apparatus of FIG. 1 in the open position, according to various embodiments.

With reference to FIGS. 1-6 a multi-axis mixing apparatus 10 (or mixer) is shown. The mixing apparatus 10 has a housing 18 supported by a support structure 22 that preferably includes at least one leg 24, each of which can be adjustable. A movable door 12 is provided to selectively close the housing 18 when in a lowered, closed position (e.g., as in FIGS. 1-3), and to open the housing 18 when in a raised, open position (e.g., as shown in FIGS. 4-6). The door 12 is preferably hinged or slidable, and is provided with a handle 14 that can be grasped by a user to move the door such that it is opened or closed when desired. As shown, a container shelf 16 is attached to the housing 18 to facilitate loading/unloading of a container (e.g., a small container, a medium container 94, or a large container 96) into the mixing apparatus 10, and a control panel 20 is preferably provided on the housing 18. The control panel 20 can include various controls, such as an emergency off feature 21 and/or various buttons and/or screens (not shown) such that a user can input various parameters for mixing using the mixing apparatus 10. Unloading and extracting can be understood to be used interchangeably in this disclosure.

The contents of a container can be liquid, and one example is paint components to be mixed within a sealed container. As used herein, a container can include any size vessel, bucket, paint can, or any other suitable container for any suitable contents. The container can include a handle 98 attached to the various sized containers via a handle mount 100, as described below. The handle 98 can be a bail bar, or any other suitable type of handle. In other embodiments, the handle 98 can be omitted.

As shown in FIGS. 4-6, supported within and by the housing 18 is a mounting frame 30 for supporting operative mixing features 28, which can include various frames, motors, mechanical extraction features, and the like.

The operative mixing features 28 include an upper plate 40 and a lower plate 50 that are adjustably positionable relative to each other, and can be used to securely clamp a container in place for mixing. Preferably, the upper plate 40 and lower plate are substantially parallel to each other at various and/or all positions. Generally speaking, components of the mixing apparatus 10 contained within the housing 18 are the operative mixing features 28, although not every feature is necessarily directly or indirectly used for mixing. A cross-sectional side view of the mixing apparatus 10 is shown in FIG. 6, which provides additional detail of certain operative mixing features 28 within the housing 18 of the mixing apparatus 10.

Figure 7:
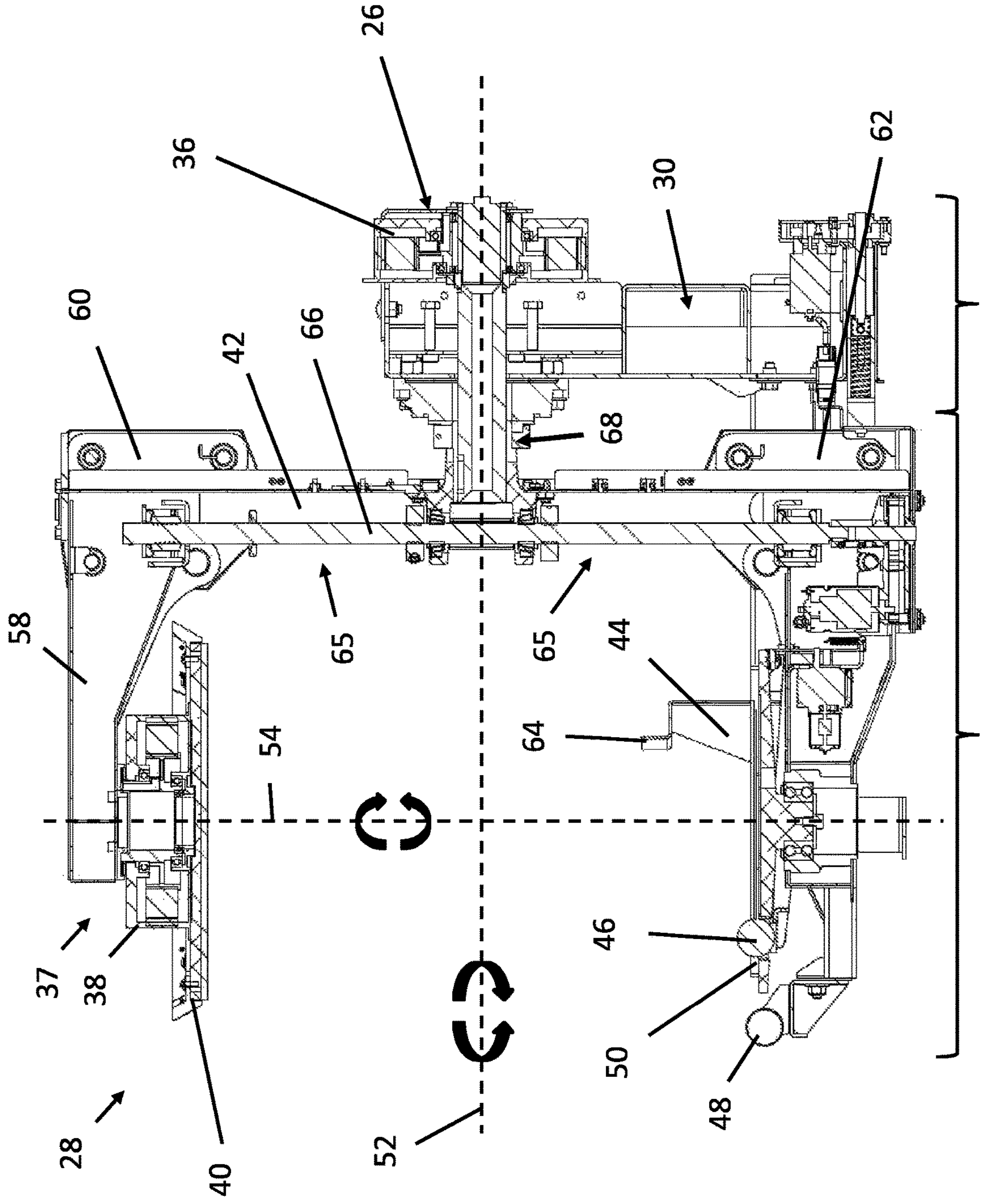
FIG. 7 is a cross-sectional side view of operative mixing features of the multi-axis mixing apparatus of FIG. 1, according to various embodiments.

FIG. 7 shows the operative mixing features 28 of the mixing apparatus in greater detail. The operative mixing features 28 provide for controlled rotational, mixing movement in two different axes, as shown. Mixing with mixing apparatus 10 can occur by "gyroscopic" or multi-axis motion. Multi-axis motion means that a container is rotated according to two (or more) axes. The two axes can include a first, spin axis 54 and a second, tumble axis 52. As shown, a tumble motor 36 mounted to the mounting frame provides rotation about the tumble axis 52 and a spin motor 38 (indirectly mounted to the mounting frame) provides rotation about the spin axis 54. The tumble motor 36 can be a direct drive, electric motor operatively connected to a controller (not shown). Example controllers can include a hardware processor operatively coupled to at least a memory.

Also with reference to FIG. 7, the operative mixing features 28 can be variously characterized as being comprised within a rotatable tumble assembly 32 attached to tumble drive components 34. More specifically, the tumble motor 36 of the tumble drive components 34 is fixedly attached on one end to the mounting frame 30 via a stationary tumble motor frame 26, and attached on another end to a tumble frame 42 of the rotatable tumble assembly 32 via an attachment flange 68. The tumble motor 36 can rotate the tumble frame 42 of the rotatable tumble assembly 32 rotate according to the tumble axis 52. The spin axis 54 and tumble axis 52 can be perpendicular to each other. Preferably, the spin axis 54 is perpendicular to the lower plate 50 of the mixing apparatus 10. The orientation and positioning of the axes 52, 54 can affect where the contents travels inside the container and the velocity and shear in the contents, affecting mixing. During mixing, it is generally preferable that a center of mass of the container and contents thereof are substantially balanced according to each axis of rotation, e.g., the tumble and spin axes 52, 54.

Comprised within the rotatable tumble assembly 32 and rotated by the spin motor 38 is a spin sub-assembly 37, itself comprising the spin motor 38. The spin motor 38 can be a direct drive, electric motor operatively connected to a controller (not shown). The spin motor 38 is configured to provide independent rotation about the spin axis 54 relative to the tumble motor 36. The spin motor 38 can be operatively connected to the controller and/or a power source, among other components, via one or more slip ring (not shown) and/or any other suitable electrical connections that allow for rotation while maintaining an operative connection. The spin motor 38 is attached to the tumble assembly 32 via a spin motor support frame 58. The upper plate 40 and the lower plate 50 can each be generally planer and circular and centered for rotation according to the spin axis 54. The lower plate 50 preferably comprises one or more openings and/or graduated, stepped indentations for receiving various sizes of containers, as described in greater detail below.

According to embodiments, separate motors 36 and 38 are provided, one for each axis 52, 54 of rotation within the mixing apparatus 10. Preferably, no gears or drive belts are used to effect rotation according to the spin and tumble axes 52, 54. For example, direct drive electric motors preferably provide simple construction and wiring. Direct drive electric motors preferably eliminate the need for gears or belts in order to impart rotation of the various components. Direct drive motors can also reduce noise and wear during motor operation. Furthermore, direct drive motors can provide an improved and simpler ability to independently control rotational speed (RPM) of both the spin and tumble movements. The tumble 36 and/or spin motors 38 as used herein can be alternating current (AC) or direct current (DC) electric motors, among any other type of suitable motor. The motors preferably operate at between about 12 and 64 Volts, AC or DC, and preferably are rated for between 100 and 2,000 Watts, each. The motors 36, 38 can be operated at substantially the same speed, different speeds, or at various changing speeds and/or power levels during a mixing process, among various other combinations. Furthermore, the controller (not shown) can be configured to selectively control at least one of the motors 36, 38 to be selectively operated as a brake mechanism, e.g., short various electrical connections, or operate as a generator or the like, if and when it is desirable to slow or stop the mixing process.

In preferable embodiments, at least one slip ring is utilized to provide an operative connection between a controller and at least one motor, and/or a motor and another motor within the mixing apparatus 10. As used herein, a slip ring has at least one sliding electrical contact that rotates with a moving structure or contact relative to another structure or contact. Contemplated wiring arrangements herein also account for the upper and lower plate 40, 50 moving toward and away from each other, and provide flexible and/or movable wiring such that an operative connection is maintained during movement of various parts of the mixing apparatus 10 before, during, and/or after mixing operation. Typical arrangements that utilize gears and/or belts typically mean that the ratio of spin and tumble are fixed and cannot be changed. By employing separate tumble and spin motors 36, 38, embodiments of the present disclosure allow for change in ratios of the two motors any time during a mixing process.

Various container clamping features can provide linear movement of the upper plate 40 relative to the lower plate 50 such that a container can be held securely for mixing using the mixing apparatus 10. The rotatable tumble assembly 32 preferably comprises the clamping features, which together rotate according to the tumble axis 52 during mixing operation. A linear clamping mechanism 65 is preferably generally symmetrical and can be spin balanced with or without a container clamped thereby, and comprises a clamp screw 66, held to the tumble frame 42 by a clamp screw mount 67. The clamp screw 66 is operatively rotatable by a clamp screw motor (see, e.g., 73 of FIG. 12) such that one or more carriers are moved during operation of the linear clamping mechanism 65. The container can be held by the linear clamping mechanism 65 by the two plates 40 and 50 as they move and clamp on the container containing contents to be mixed at the start of a mixing cycle.

The upper plate 40, spin motor 38, spin motor support frame 58, and various other upper components can be movably attached to an upper carrier 60 that is linearly moveable according to the tumble frame 42, which can comprise one or more rails, by actuation of the clamp screw 66. Likewise, the lower plate 50, and various extraction components comprised within the rotatable tumble assembly 32 can also be movably attached to a lower carrier 62 that can be similar to the upper carrier 60. The lower carrier can also be linearly movable according to the tumble frame 42 by actuation of the clamp screw 66, preferably in a direction opposite a linear movement of the upper carrier 60.

According to various embodiments, the mixing apparatus 10 described herein can automatically and securely hold a container of various sizes when a user input is received. The user input can be received by depressing a button or turning a knob, among various other controls of the control panel 20 of the mixing apparatus 10. As shown, the control panel 20 of the mixing apparatus 10 optionally includes the emergency off feature 21, which can be located in any location of the mixing apparatus 10. The user input can include a selection of a mixing cycle, speed of rotation, etc. Based on the user selection and/or automatic or detected settings, the mixing apparatus 10 preferably mixes the container for a predetermined time and according to a predetermined mixing cycle, such as including a mixing time and/or mixing programming. The mixing time and/or programming are preferably selected according to predetermined stored settings. In some embodiments, the user can adjust an automatically set time and/or mixing cycle using the control panel 20.

Prior to and during mixing, the container can be securely held for mixing by the linear clamping mechanism 65. More specifically, upon a determination that the mixer door 12 is closed, the upper 40 and lower plate 50 will move linearly toward each other, and clamp and securely hold the container to be mixed. The user can place the container to be held and mixed within the mixing apparatus 10 prior to the cycle. Alternatively an automated machine, which can be programmed to operate similarly to a human user, can be configured to automatically place the container in the mixing apparatus 10 before the container is also clamped automatically.

The container is preferably inserted into the mixing apparatus 10 in a certain preferred orientation. For example, it may be preferable that the container is placed in the mixing apparatus 10 in an orientation such that a handle 98 of the container is movable in a dihedral arc toward an opening in the mixing apparatus 10, e.g., toward the position of the door 12. In some embodiments, the container is placed in the mixing apparatus 10 such that a front label is facing out, or toward the point of entry. Preferably, before loading and/or removing the container relative to the mixing apparatus 10, the linear clamping mechanism 65 is latched or locked in place so the lower plate 50 supporting the container is in a lowered position and the container is face or label forward. Upon a mixing process ending, the mixing apparatus 10 can return the container to an upright and face-out position, and rotate the container until the handle 98 is facing forward.

Also shown in FIG. 7 are various extraction and/or loading components of the mixing apparatus 10. It may be desirable to provide assistance to a user or other automated machine for extraction of a container after mixing, or during loading before mixing. Specifically, a rolling component such as a loading roller 48 is shown adjacent to the lower plate 50, at a point where a container would be initially placed in the mixing apparatus 10 to assist in loading or unloading a heavy container. Also shown is a pusher mechanism that includes a pusher frame 44 with a pusher tab 64 attached to a crossbar portion of the pusher frame 44 such that a container can be contacted and pushed by the pusher tab 64 when the pusher frame is moved. Yet further shown is another rolling component, a vertical extraction roller 46, that is moveable such that it penetrates an opening (see 75 of FIG. 12) in the lower plate 50 when desired for extraction of a container. In some embodiments, the front panel of the machine comes off to make the machine ready and/or accessible for automation. As used herein, a rolling component is a general term that can denote a roller, a roller bearing, or any other type of rolling or bearing configuration.

Figure 8:
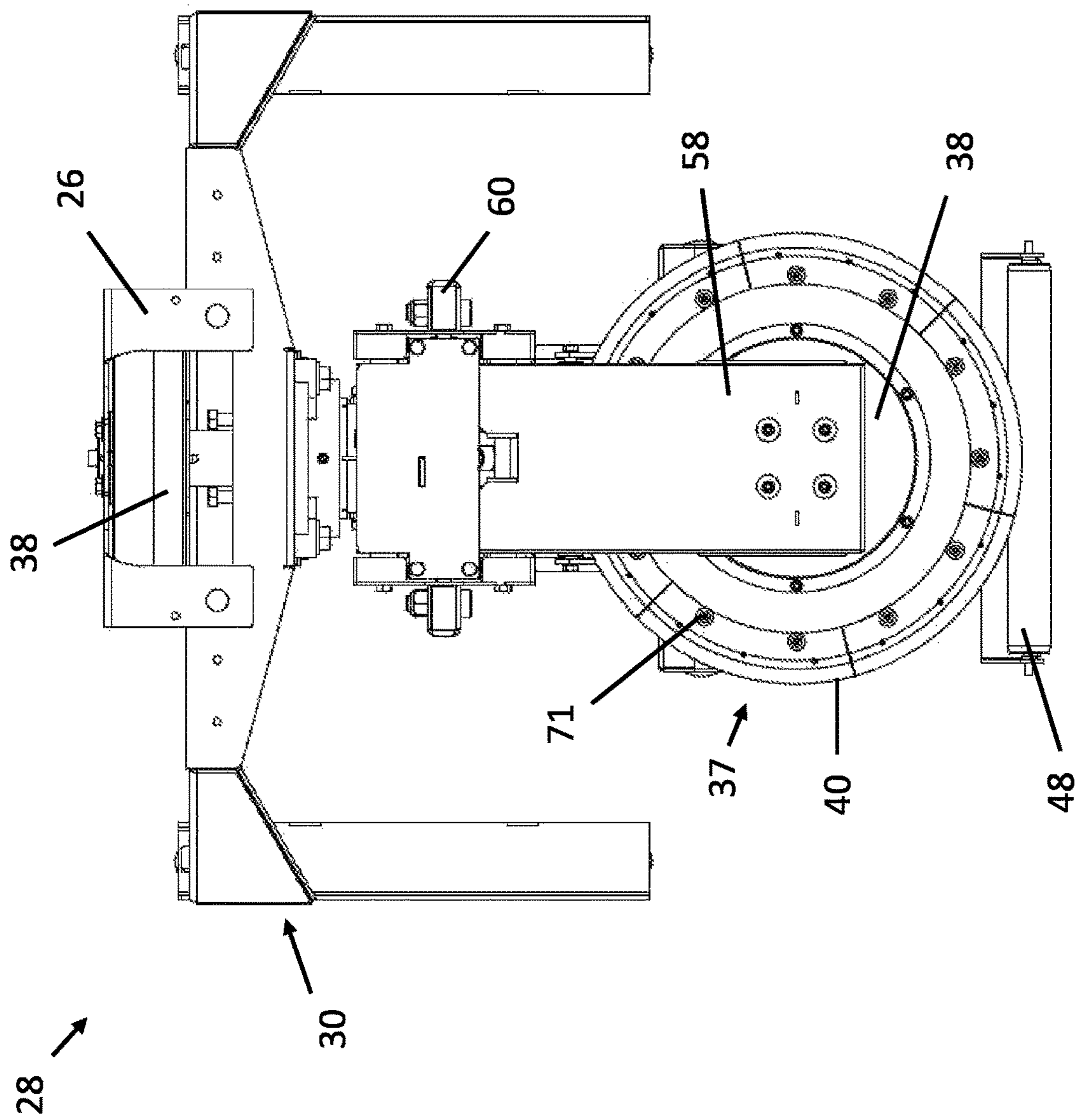
FIG. 8 is a top view of the operative mixing features of the multi-axis mixing apparatus of FIG. 1, according to various embodiments.
Figure 9:
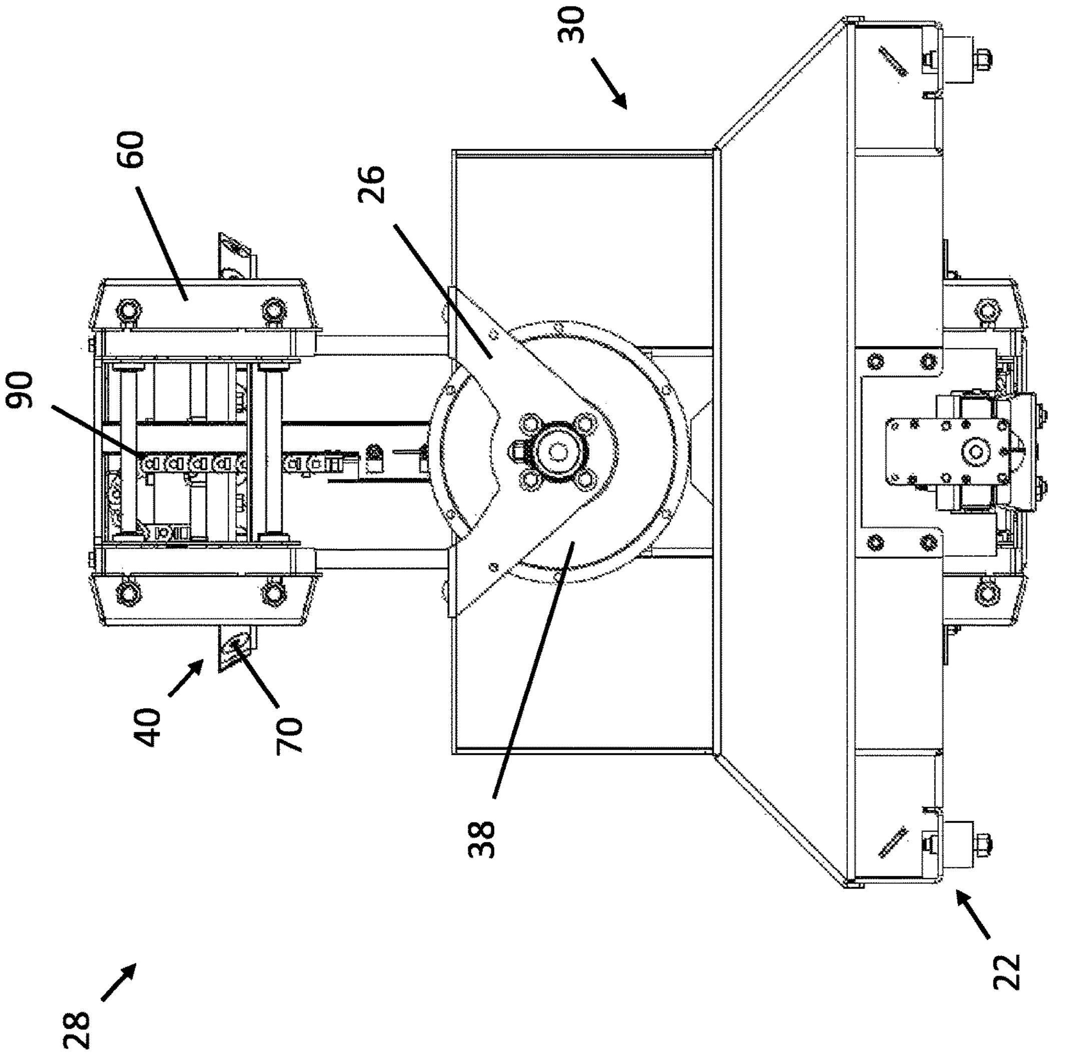
FIG. 9 is a rear view of the operative mixing features of the multi-axis mixing apparatus of FIG. 1, according to various embodiments.
Figure 10:
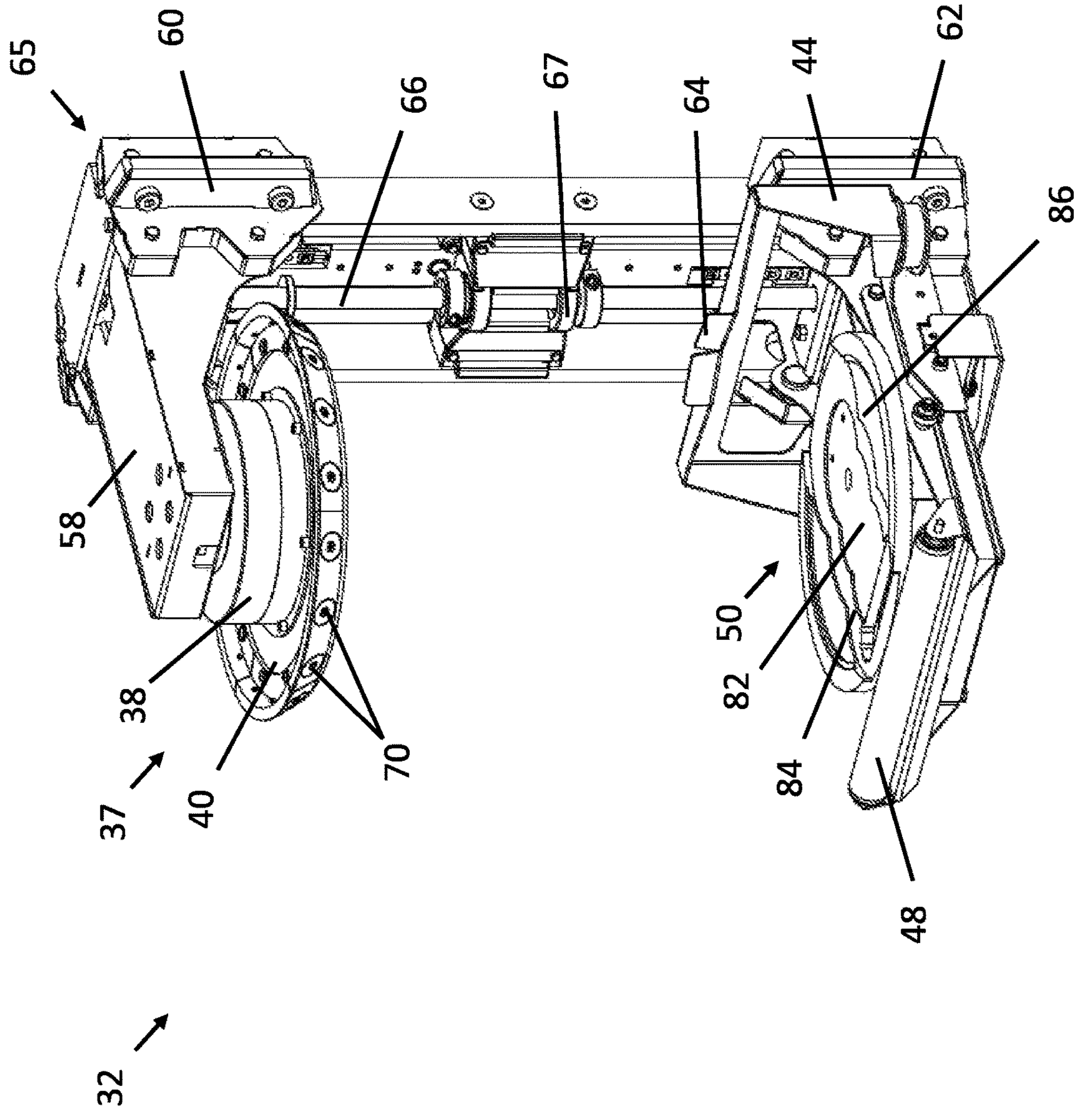
FIG. 10 is an isometric view of a rotatable tumble assembly of the multi-axis mixing apparatus of FIG. 1, according to various embodiments.
Figure 11:
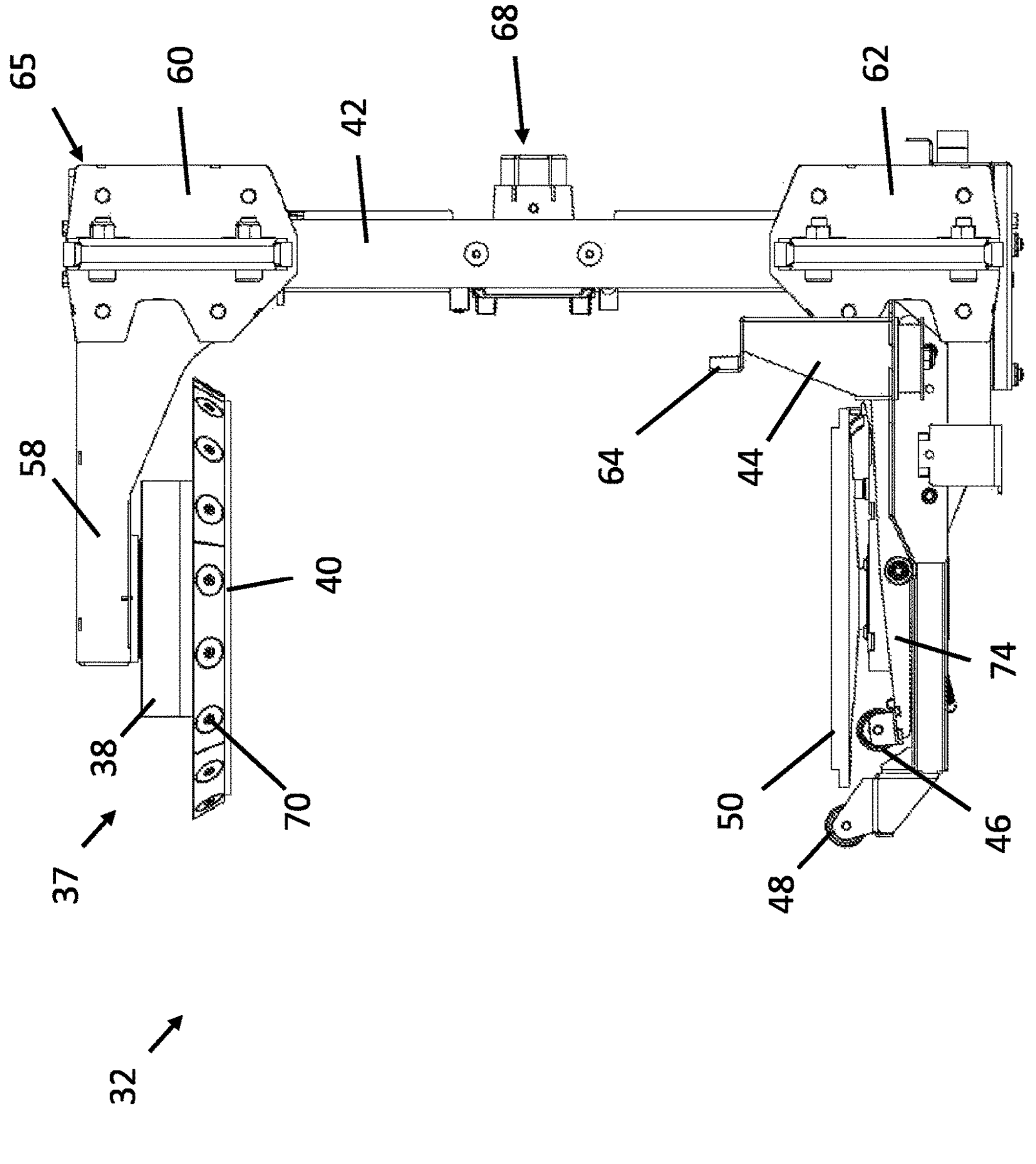
FIG. 11 is a side view of the rotatable tumble assembly of the multi-axis mixing apparatus of FIG. 1, according to various embodiments.

With reference now in particular to FIGS. 8-11, various specific parts of the operative mixing features 28 of the mixing apparatus 10 are shown. As shown in FIG. 8, on the upper plate 40 of the spin sub-assembly 37 are one or more fasteners 71, which can be used to secure various components of the spin sub-assembly together during assembly. With reference now to FIG. 9, the upper plate also comprises one or more magnets 70 positioned around a perimeter of the upper plate 40. The magnets 70 can be any suitable type of magnet, (e.g., permanent or electromagnet) and are attached to the upper plate 40 directly or indirectly. The magnets 70 are positioned to attract and secure a handle 98 (see, e.g., FIG. 13), such as a metal handle 98 of a container during mixing. A flexible connection 90 is also shown that preferably provides an operative connection to various components of the rotatable sub-assembly 32 and allow for linear movement of the various carriers 60, 62 while maintaining the operative connection. As shown, the flexible connection 90 is a semi-flexible chain-style connection that provides a controlled bending of various cables and/or connection without unduly pinching or stressing the various connections.

In previously existing configurations, an elastomeric cord or a spring with a hook on an end were manually attachable to a bail or handle of a container for holding during mixing. The cord or spring was for example located a rear portion of the mixer interior. These manual arrangements have had drawbacks, such as generally requiring that the handle be at the rear of the container. This made it inconvenient to grasp the handle when inserting and removing the container. As the existing configurations were manual, extra time was required for attachment and it was also possible for a user to forget to attach the bail or handle of the container to the cords or spring such that unwanted bail or handle movement during mixing were avoided.

In this disclosure, it is contemplated that the container is inserted into the mixing apparatus 10 with the handle 98 facing forward or outward. Once the container is inserted into the mixing apparatus 10, and as the container approaches the upper plate 40, the magnets 70 automatically attract and hold the handle 98 before mixing. In some examples, the magnets 70 attract and hold the handle 98 after the container is clamped by the linear clamping mechanism 65. Holding the handle 98 during mixing can reduce undesirable noise since the handle 98 would not move relative to the container, and would not strike other components as the container is moved and mixed.

The magnets 70 can provide a handle 98 holding feature for various container sizes and configurations. By automatically holding the handle 98 during mixing, the effort and time expended by a user can be reduced, and there is no longer a need to apply a hook to hold the handle 98 in place. The bail or handle 98-holding function also improves the user experience by reducing or eliminating the likelihood that a user disadvantageously neglects to secure the handle 98 prior to mixing. The handle holding magnet 70 also assists automation since the handle 98 position is predictable and controlled. The magnets 70 automatically let go of the handle 98 when the linear clamping mechanism 65 is opened, thus pulling the handle 98 out of the effective reach of magnets 70.

Carriers 60, 62 provide smooth, controlled movement of the plates 40 and 50 of the linear clamping mechanism 65, among other components of the rotatable tumble assembly 32. Each carrier 60, 62 comprises multiple carrier wheels 76 that are configured to roll along the tumble frame 42 in a controlled, linear manner when the linear clamping mechanism 65 is operated. Preferably, and as shown, the carriers 60, 62 are provided with carrier wheels 76 on at least two sides of the tumble frame 42, and preferably on three or more sides of the tumble frame in order to guide the carriers 60, 62 predictably and smoothly. Also as shown, the carrier wheels 76 are provided in tandem pairs, such that stability is yet further improved. The carrier wheels 76 can utilize roller bearings in order to provide smooth, consistent, and long-lasting performance. Preferably, rolling components such as sealed roller bearings are used.

In preferable embodiments, the mixing apparatus 10 can be entirely or substantially free of grease for lubrication of various mechanisms. For example, the upper and lower carriers 60, 62 can move on a set of rails of the tumble frame 42 using rolling components such as bearings within wheels 76, such as roller bearings as described herein. In existing mixers, it is typical to use bronze against steel, which typically requires greasing. Friction of a roller bearing is generally lower than a corresponding arrangement using greased bronze. Clamp force is also generally more constant over time when greasing of various parts is avoided, as grease can spread, dissipate, or otherwise become less functional over time. For example, instead of grease, examples of carriers (such as 60, 62) and/or nuts (e.g., extraction hook carrier 106) that rides on various screws (e.g., leadscrews) can be made of a lubricated engineered plastic, preferably avoid periodic maintenance and lubrication.

Various sized and shaped indentations in the lower plate 50 configured to receive various sized containers for mixing. The various indentations are shown best at FIGS. 10, 14, and 15, and can provide a tiered, stepped-type arrangement. As shown, a small indentation 82 for receiving a small container (not shown) is lowest positioned and narrowest in diameter, a medium indentation 84 for receiving a medium container 94 is positioned higher (shallower) and wider than the small indentation, and a large indentation 86 is positioned higher (yet shallower) and widest for receiving a large container 96. Although certain shapes and sizes of indentations are shown, different, fewer, additional, or any other configuration of the lower plate 50 is also contemplated. The various indentations can instead take the form of posts, notches, or any other protrusions without departing from the scope of this disclosure.

Figure 12:
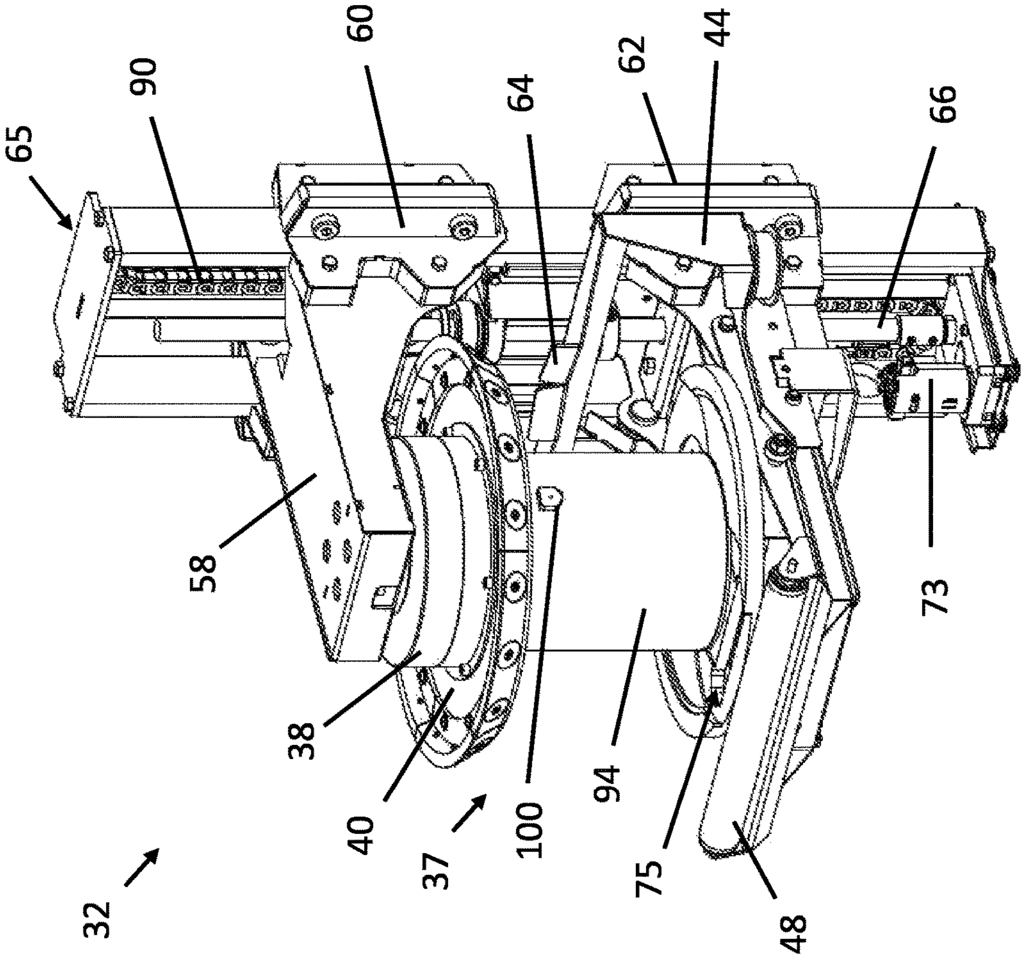
FIG. 12 is an isometric view of the rotatable tumble assembly of the multi-axis mixing apparatus of FIG. 1 shown clamping a medium container, according to various embodiments.
Figure 13:
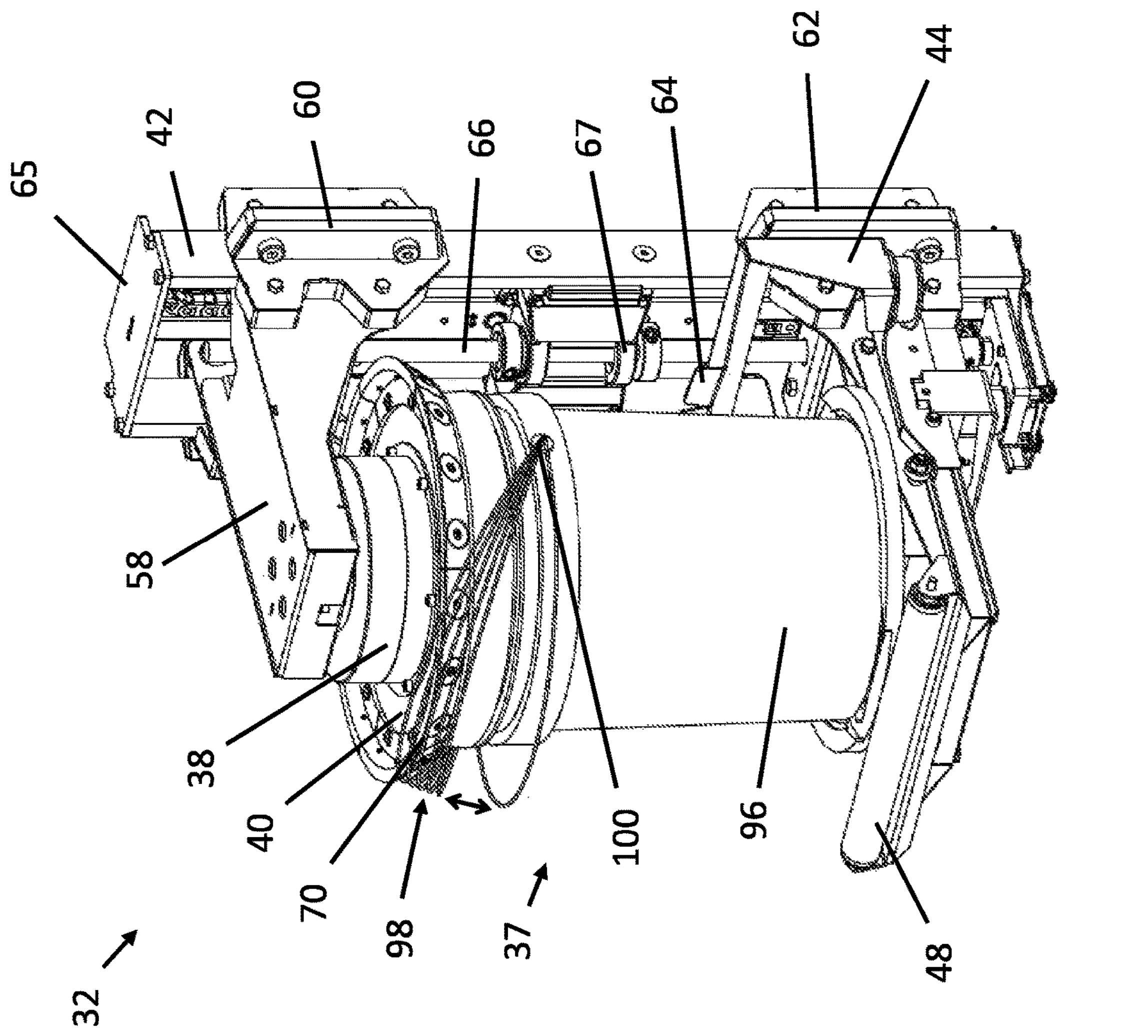
FIG. 13 is an isometric view of the rotatable tumble assembly of the multi-axis mixing apparatus of FIG. 1 shown clamping a large container, according to various embodiments.

With reference now in particular to FIGS. 12 and 13, various sizes of containers are shown as they are clamped by the upper and lower plates 40, 50 of the spin sub-assembly 37. Specifically, FIG. 12 shows the medium container 94 located on the lower plate 50 and fitted into the medium indentation 84. FIG. 13 shows the large container 96 located on the lower plate 50 and fitted into the large indentation 86.

The medium container 94 as shown in FIG. 12 has a handle mount 100, although no bail or handle is shown. In FIG. 13, a handle 98 is shown mounted to the handle mount 100 of the large container 96. Also as shown, the handle 98 (or handle) is movable along a dihedral angle as it is rotatably mounted at two ends to bail mounts 100. Also as shown in FIG. 13, the handle 98 can be composed of a metal, and more specifically of a ferromagnetic metal, that can be attracted to one or more bail magnets 70 of the upper plate 40 when the container (e.g., large container 96) is placed on the lower plate 50 and clamped by the linear clamping mechanism 65.

Figure 14:
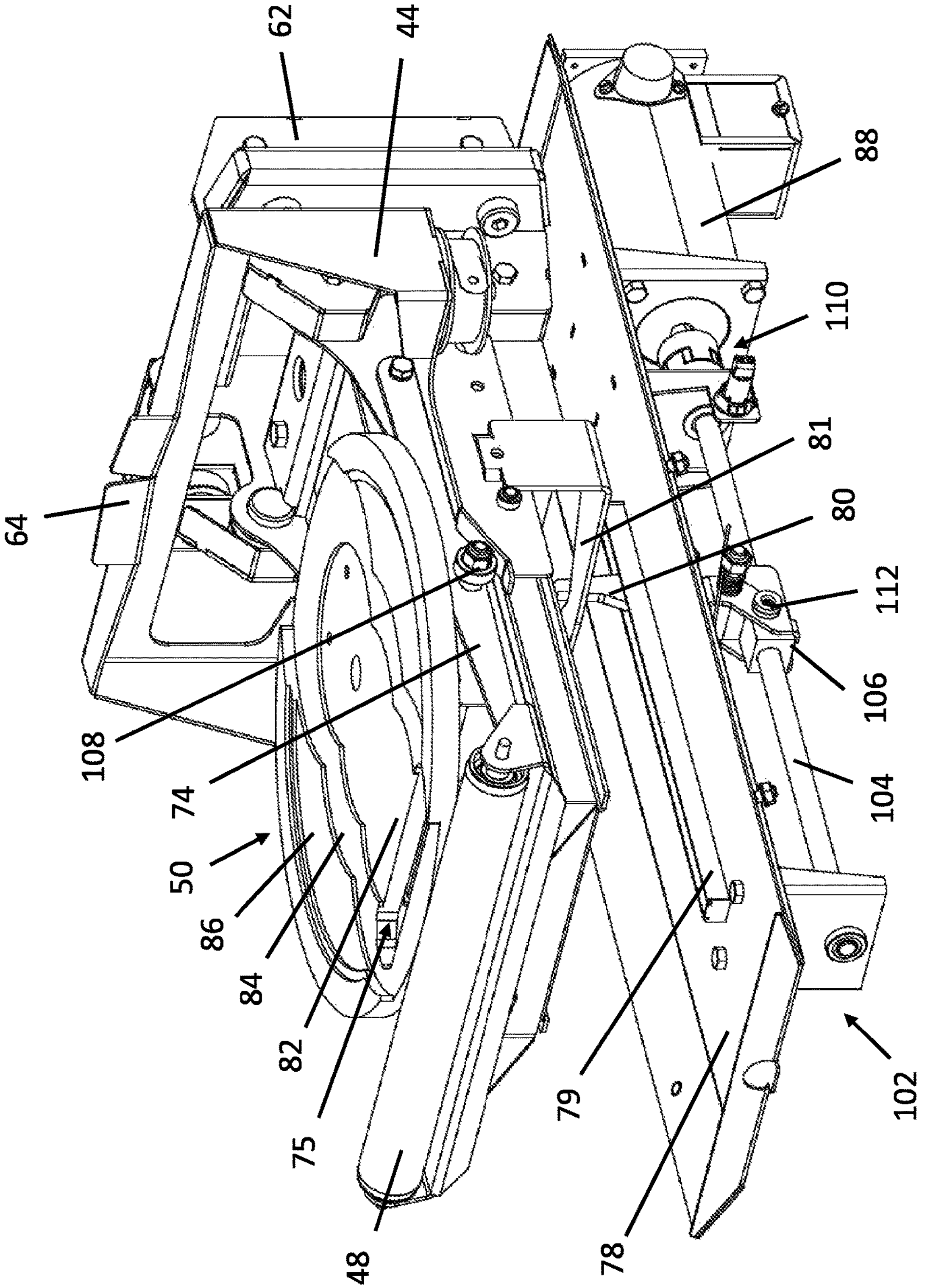
FIG. 14 is an isometric view of extractor components of the multi-axis mixing apparatus of FIG. 1 shown in a retracted position, according to various embodiments.
Figure 15:
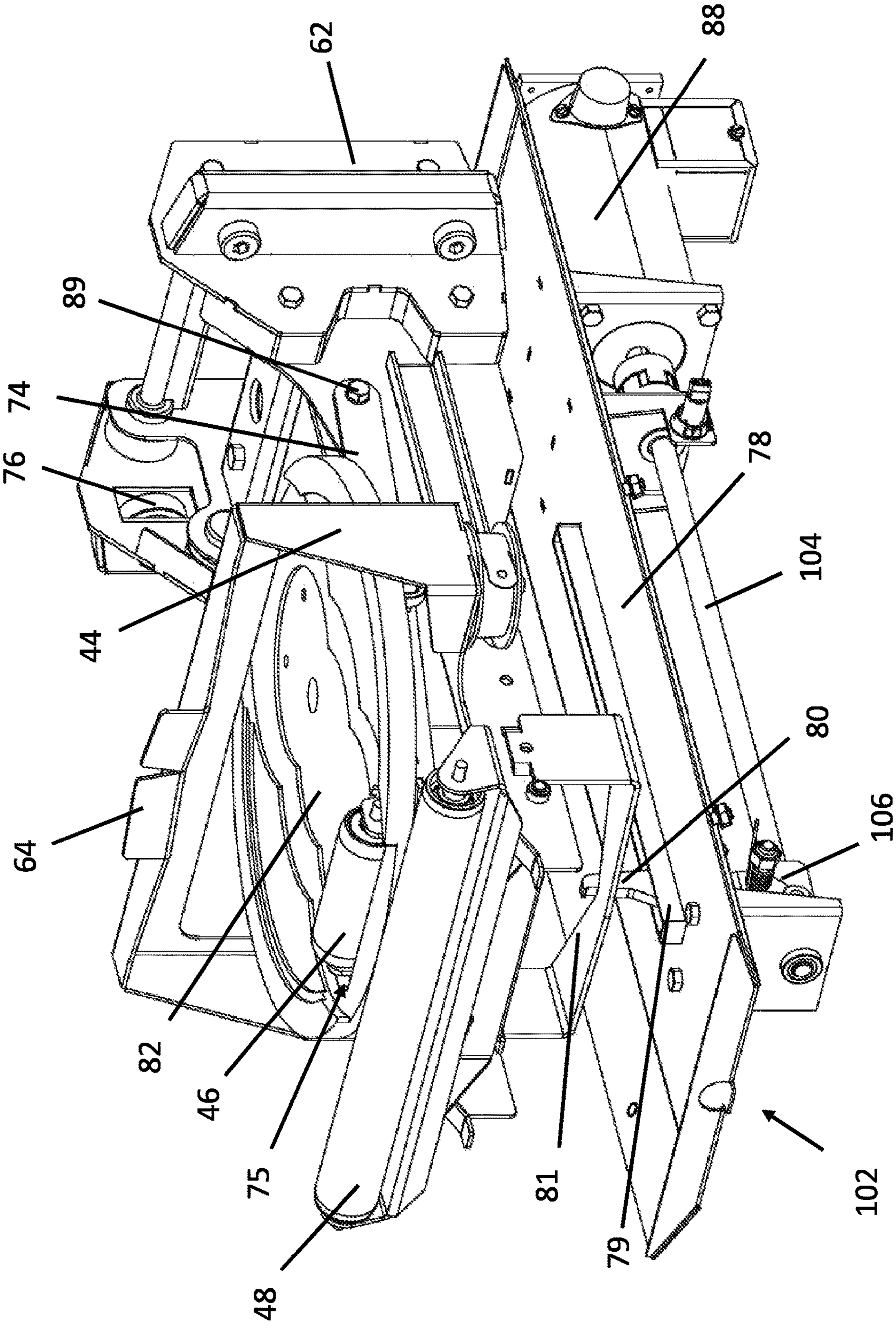
FIG. 15 is an isometric view of the extractor components of the multi-axis mixing apparatus of FIG. 1 shown in an extracting position, according to various embodiments.

FIGS. 14 and 15 show isometric views of an example extractor mechanism 102 of the mixing apparatus 10 at various stages in an extraction procedure. More specifically, FIG. 14 shows a retractable extractor mechanism 102 in a retracted position, such as it would be during a mixing process. FIG. 15 shows the extractor mechanism 102 in an extracting position as a container would be extracted, e.g., after mixing. In other embodiments, the extractor mechanism utilizes an extractor arm that does not pivot or retract for operation, e.g., a "fixed," or non-pivoting style extractor arm (not shown). It is to be understood that the shown embodiment is merely one possible example of an extractor mechanism and that a different types of extractor and extractor arm configurations are also contemplated within the present disclosure.

The extractor mechanism 102 is preferably configured to displace a container relative to the lower plate 50 of the spin sub-assembly 37. FIG. 14 shows the extractor mechanism 102 in a retracted position, and FIG. 15 shows the extractor mechanism 102 in an extracting position. As shown in FIG. 15, the extractor mechanism 102 comprises a lifting or lever extractor arm 74 attached at arm connection 89 and that pivots at bolt 108 such that extraction roller 46 selectively passes through the opening 75 in the lower plate 50. As shown, the extractor mechanism 102 also comprises a pan 78 positioned below the lower plate 50. The pan 78 comprises a linear slot 79 configured to permit an extractor hook 80 to selectively penetrate the pan 78 when the hook 80 is moved during container extraction. Operatively connected to the pusher frame 44 is a hook catch bar 81. As the hook 80 is moved during extraction, the hook 80 contacts and pushes on the hook catch bar 81, thus moving the pusher frame 44 and the container to be extracted. In some embodiments, the pan 78 under the rotating frame is removable, thus facilitating easy cleaning of any spilled, leaked, or otherwise collected contents. Extractor mechanism, as shown in FIGS. 14 and 15, also includes the opening 75, the extraction roller 46, various indentations (e.g., small indentation 82), and the pusher tab 64.

Containers, and in particular a large container 96, can be beneficially extractable with the assistance of the extractor mechanism 102. Ledges in the lower plate 50, such as of the various indentations, may catch on various portions of containers of varying sizes. In various embodiments, the shape of a supporting lower plate 50 can allow for automatic or assisted extraction of containers. Large and/or heavy containers benefit particularly from assisted extraction after mixing.

Figure 16:
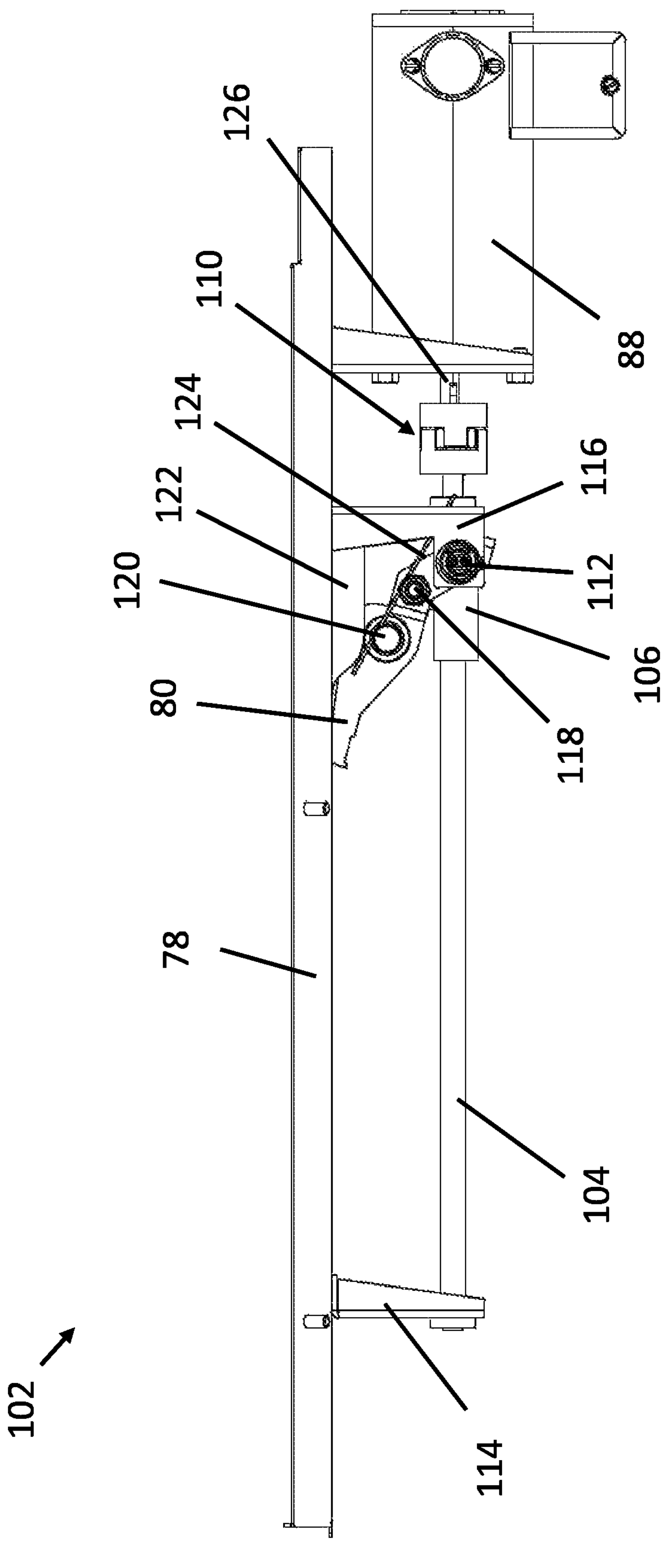
FIG. 16 is a side view of selected extractor components of the multi-axis mixing apparatus of FIG. 1 shown with a hook in a retracted position, according to various embodiments.
Figure 17:
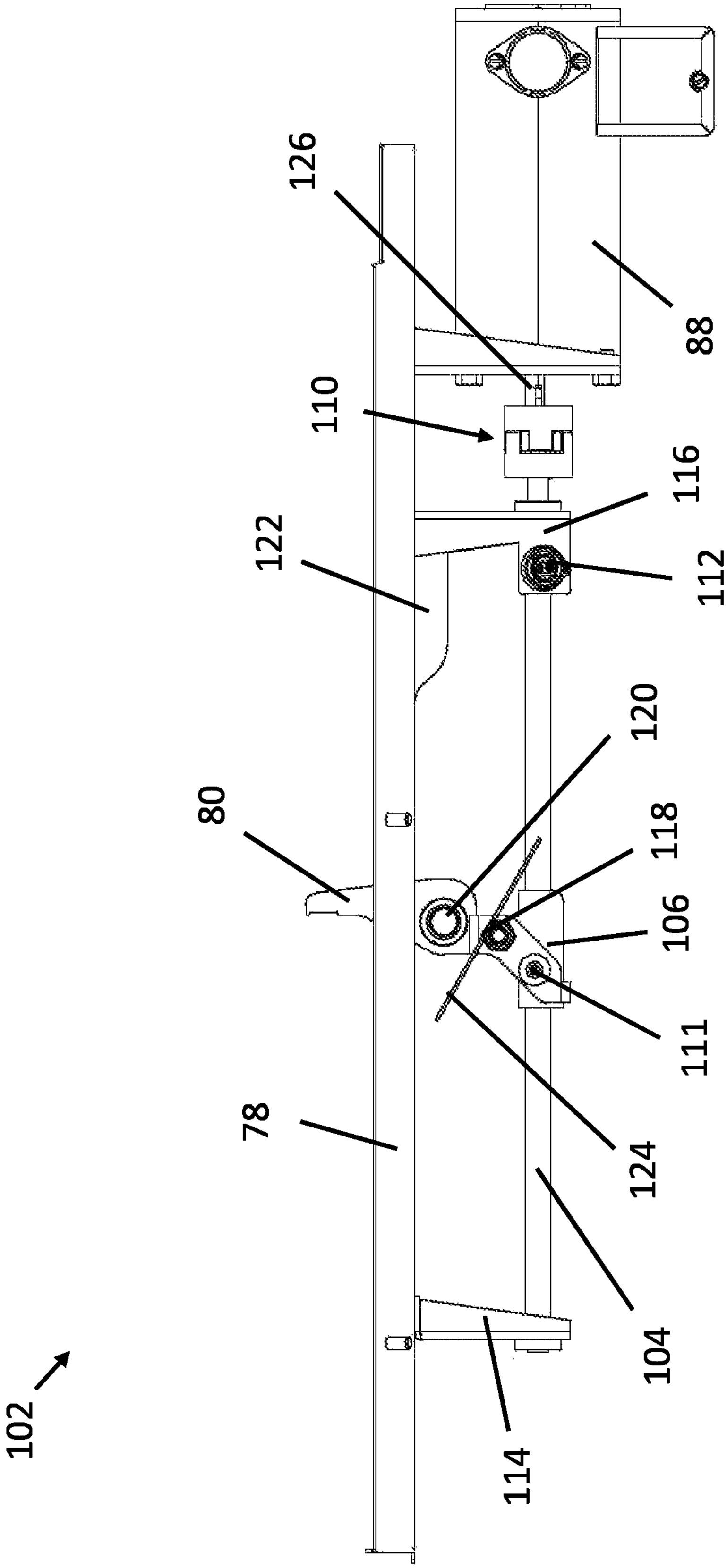
FIG. 17 is a side view of the selected extractor components of the multi-axis mixing apparatus of FIG. 1 shown with a hook in an intermediate extracting position, according to various embodiments.
Figure 18:
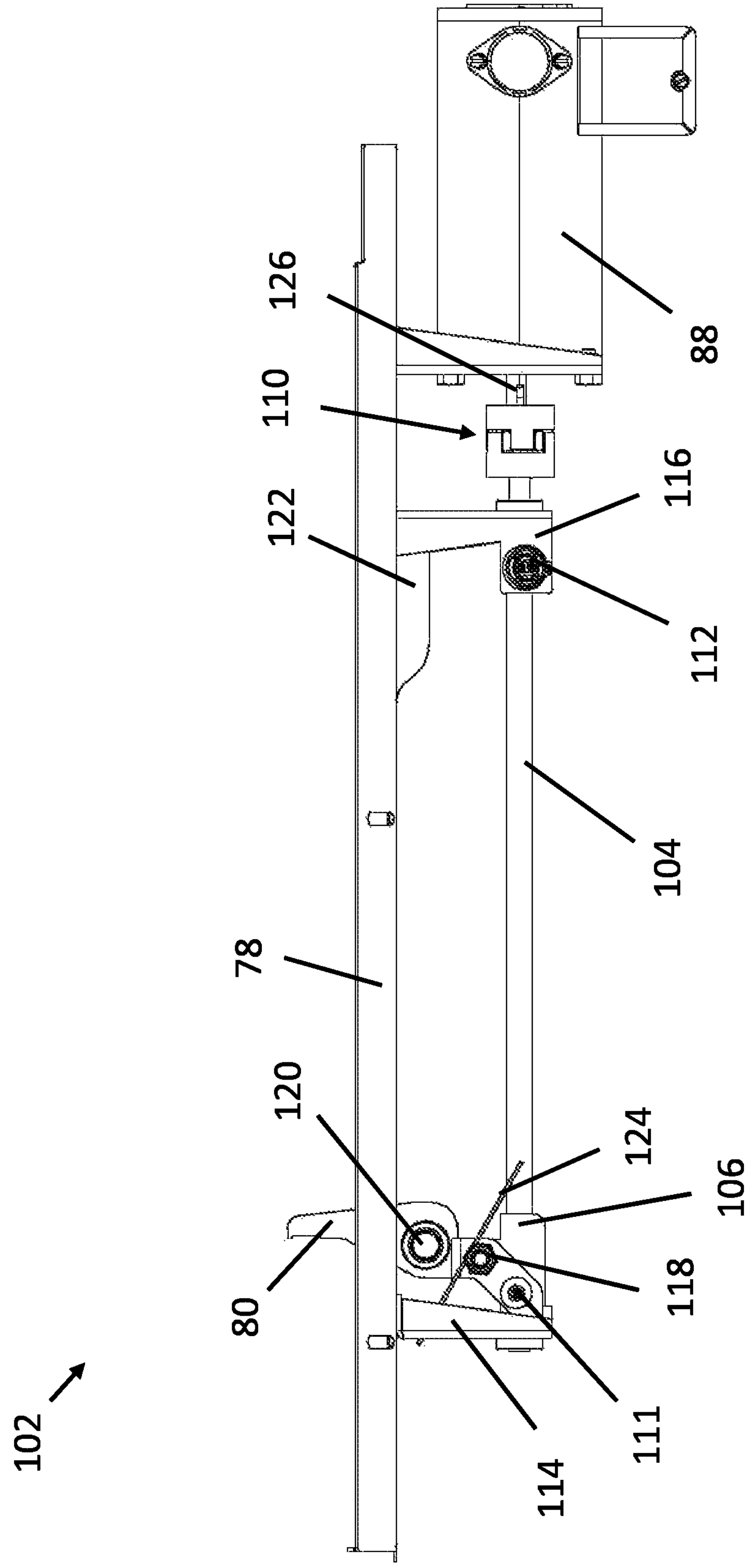
FIG. 18 is a side view of the selected extractor components of the multi-axis mixing apparatus of FIG. 1 shown with a hook in an extracting position, according to various embodiments.

Shown best with reference to FIGS. 16-18, the hook 80 is operatively connected to an extractor motor unit 88 that moves the hook using a linear actuator, such as a rotatable extractor screw 104 that when rotated by the extractor motor unit 88 causes an extraction hook carrier 106 attached to the hook 80 to move linearly during extraction. The extractor motor unit 88 output shaft 126 is operatively connected to the extractor screw 104 by a drive coupling 110 as shown. The extractor screw 104 can be rotatably held in place by a stationary motor side mount 116 and a stationary distal mount 114, as shown.

In some embodiments, a user or an external automated mechanism (not shown) can insert and/or remove the container from the mixing apparatus 10 before or after mixing. The automated mechanism would potentially have difficulty properly positioning the handle 98. The extractor mechanism 102 described herein can assist such automated mechanism by automatically removing a container from the mixing apparatus 10, such as with a press of a button. The loading and/or extraction rollers 48, 46 under the front edge of the container lifts and/or supports the container. This lifts and/or facilitates movement of the container over any ledge that may be present. A ramp can also be provided for roller vertical movement. The combination of extractor mechanism 102 features therefore makes manual and/or automatic loading or unloading of containers easier than before.

FIGS. 16-18 show various example steps of the extractor mechanism 102 as it operates. FIG. 16 shows a first step in an extraction process of a container for use with the mixing apparatus 10. As shown, FIG. 16 shows an embodiment where an optional flip up hook 80 is used, that retracts when not being operatively used. FIG. 16 shows the extraction mechanism in a default, retracted position, and FIGS. 17 and 18 show sequential extraction positions as the container is extracted and where the hook 80 extends through the pan 78 for use in extraction. FIG. 17 shows an intermediate extraction position, and FIG. 18 shows a more fully extracted position of the extraction mechanism 102.

In preferable embodiments, various sensor components determine a position of the hook carrier 106. For example, it may be desirable to assure that the hook carrier 106 and hook 80 are retracted before starting a mixing process. As shown best in FIG. 17, a magnet 111 is coupled to the hook carrier 106 and a magnet sensor 112 is coupled to the motor side mount 116. When the magnet 111 is proximate the sensor 112 a signal can be sent to a controller to indicate that the hook 80 and carrier 106 are retracted. Other suitable forms and examples of sensors and arrangements are also contemplated herein.

The hook 80 preferably is either always vertically oriented (e.g., fixed embodiments) or the hook springs cause the hook 80 to rotate up from a more horizontal position to a more vertical, latching position to push the hook catch bar 81 during operation. The pusher tab 64 of the pusher frame 44 slides the container forward on the lower plate 50 and roller(s) 46, and/or 48 until the container is easily removed. In embodiment where the pusher frame 44 is pulled by a flip up hook 80, one or more biasing element such as a spring 24 can retract the hook 80 when not being used to extract the container. The spring 24 can be any form of biasing element, such as a leaf spring, clock spring, coil spring, etc. A bearing ramp 122 can protrude downward, thus applying pressure on a hook bearing 120 of the hook 80 when the hook 80 is retracted. The shape of the bearing ramp 122 can provide a certain amount of hook 80 movement and/or rotation as the hook 80 is retracted.

In various embodiments, including where the hook 80 is pivotable such that it flips or rotates up or down or is fixed in a vertical orientation, the linear (e.g., horizontal) position of the hook 80 can be motivated by the extractor motor unit 88. In the example when the hook 80 is pivotable, a hook pivot bolt 118 can provide a pivot axis to the hook 80. The hook spring 124 can provide a bias to the hook 80, for example, such that it is in a flipped up position by default unless a contact between a hook bearing 120 and a bearing ramp 122 causes the hook to be flipped down when retracted.

According to some embodiments, at a lower portion of the mixing apparatus 10, the extractor motor unit 88 rotates the extractor screw 104 that pushes the hook 80 attached to the extraction hook carrier 106 forward. In other embodiments, a belt or other drive or linear actuator can be used to move the hook 80.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, time periods, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

The present invention has now been described with reference to several embodiments thereof. The entire disclosure of any patent or patent application identified herein is hereby incorporated by reference. The detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

Selected examples of the present disclosure are provided below:

A first example includes a multi-axis mixing apparatus, comprising: a housing; a controller operatively connected to a first motor and a second motor; a frame supporting the first motor configured to selectively rotate a rotatable assembly; and the rotatable assembly supporting and providing an operative connection to the second motor configured to selectively rotate a rotatable sub-assembly, wherein the rotatable sub-assembly comprises a mechanism configured to receive and hold a container containing contents to be mixed, and wherein the controller is configured to independently operate the first and second motors to mix the contents.

According to some embodiments of the first example, the first motor causes a rotation about a first axis, and the second motor causes a rotation about a second axis. According to some embodiments of the first example, the first axis is perpendicular to the second axis. According to some embodiments of the first example, at least one of the first motor and second motor is a direct drive motor. According to some embodiments of the first example, the mechanism of the rotatable sub-assembly is a linear clamping mechanism. According to some embodiments of the first example, the linear clamping mechanism comprises a first plate that is adjustably positionable relative to a second plate that is substantially parallel to the first plate at various positions. According to some embodiments of the first example, at least one of the first plate and the second plate has at least one indentation for receiving a portion of the container.

According to some embodiments of the first example, the apparatus further comprises an extractor mechanism configured to displace the container relative to the sub-assembly. According to some embodiments of the first example, the sub-assembly comprises an opening through which a lifting extractor arm of the extractor mechanism can pass. According to some embodiments of the first example, the lifting extractor arm is fully withdrawn from the opening when the apparatus is in use. According to some embodiments of the first example, the extractor mechanism comprises a linear actuator and an extractor hook that is caused to be selectively extended and rotated by movement of the linear actuator such that the extractor hook contacts the container indirectly or directly upon operation of the linear actuator, and selectively displaces the container from the sub assembly. According to some embodiments of the first example, the linear actuator comprises a leadscrew mechanism.

According to some embodiments of the first example, at least one of the first and second plates comprises at least one magnet configured to attract and hold a handle of the container. According to some embodiments of the first example, the handle is composed of metal. According to some embodiments of the first example, the at least one magnet is configured to attract the handle of the container when the apparatus is in use. According to some embodiments of the first example, the container is a paint container and the contents include paint to be mixed. According to some embodiments of the first example, the apparatus further comprises a power supply unit operatively connected to at least the first motor and the second motor. According to some embodiments of the first example, at least one connection comprises a slip ring connection. According to some embodiments of the first example, the controller selectively operates the first motor at a different speed than the second motor during a mixing process. According to some embodiments of the first example, the controller selectively operates the first motor at substantially the same speed as the second motor during a mixing process. According to some embodiments of the first example, the controller selectively operates the first motor and the second motor at various changing speeds and/or power levels during a mixing process.

According to some embodiments of the first example, the first motor is a tumble motor and the second motor is a spin motor. According to some embodiments of the first example, at least one of the first and second plates of the sub-assembly comprises a rolling component configured to operatively support the container during a container extraction process. According to some embodiments of the first example, the controller is configured to selectively control at least one of the first motor and the second motor is to selectively operate the first motor and/or the second motor as a brake mechanism. According to some embodiments of the first example, the apparatus is substantially free of grease for lubrication of various mechanisms. According to some embodiments of the first example, the apparatus comprises lubricated engineered plastic for lubrication of at least one component. According to some embodiments of the first example, the apparatus comprises at least one roller bearing.

Also disclosed is a method of mixing according to the operation of the apparatus of the first example. Also further contemplated is a paint mixer, comprising the apparatus of the first example, where the container is a paint container and the contents include paint to be mixed.

A second example includes a multi-axis mixing apparatus, comprising: a housing; a controller operatively connected to at least a first motor configured to selectively rotate a rotatable assembly; and the rotatable assembly supporting a rotatable sub-assembly, wherein the rotatable sub-assembly comprises a mechanism configured to receive and hold a container containing contents to be mixed, and an extractor mechanism is configured to displace the container relative to the sub-assembly for removal of the container.

A third example includes a multi-axis mixing apparatus, comprising: a housing; a controller operatively connected to at least a first motor configured to selectively rotate a rotatable assembly; and the rotatable assembly supporting a rotatable sub-assembly, wherein the rotatable sub-assembly comprises a mechanism configured to receive and hold a container containing contents to be mixed, and wherein the sub-assembly comprises at least one magnet configured to attract and hold a handle of the container.

A fourth example includes a multi-axis mixing apparatus, comprising: a housing; a controller operatively connected to at least a first motor configured to selectively rotate a rotatable assembly; and the rotatable assembly supporting a rotatable sub-assembly, wherein the rotatable sub-assembly comprises a mechanism configured to receive and hold a container containing contents to be mixed, the mechanism comprising at least one roller track and at least two sealed bearings connector to a carrier, the carrier configured to move linearly along the roller track such that the mechanism operates to move linearly to clamp the container for mixing.

The invention claimed is:

1. A multi-axis mixing apparatus, comprising:

a housing;

a rotatable assembly and a rotatable sub-assembly;

a controller operatively connected to a first motor and a second motor;

a frame supporting the first motor configured to selectively rotate the rotatable assembly; and the rotatable assembly supporting and providing an operative connection to the second motor configured to selectively rotate the rotatable sub-assembly, wherein the rotatable sub-assembly comprises a linear clamping mechanism comprising a first plate, a second plate, and a third motor configured to adjustably position the first plate relative to the second plate, wherein at least one of the first and second plates of the linear clamping mechanism is configured to move linearly to clamp and hold a sealed container containing contents to be mixed, wherein the controller is configured to independently operate the first and second motors to mix the contents, and wherein both the first motor and second motor are direct drive electric motors.

2. The apparatus of claim 1, wherein the first motor causes a rotation about a first axis, and the second motor causes a rotation about a second axis that is perpendicular to the first axis.

3. The apparatus of claim 1, wherein the second plate is substantially parallel to the first plate at various positions.

4. The apparatus of claim 1, wherein at least one of the first plate and the second plate has at least one indentation that is shaped and sized for receiving a portion of the container.

5. The apparatus of claim 1, wherein at least one of the first and second plates comprises at least one magnet feature configured to attract and hold a handle of the container, wherein the handle is composed of metal, and wherein the at least one magnet feature is configured to attract the handle of the container when the apparatus is in use.

6. The apparatus of claim 1, wherein at least one of the first and second plates of the sub-assembly comprises a rolling component configured to operatively support the container during a container extraction process.

7. The apparatus of claim 1, further comprising an extractor mechanism configured to displace the container relative to the sub-assembly.

8. The apparatus of claim 7, wherein the extractor mechanism comprises a linear actuator and an extractor hook that is caused to be selectively extended by movement of the linear actuator such that the extractor hook contacts the container indirectly or directly upon operation of the linear actuator, and selectively displaces the container from the sub-assembly, wherein the linear actuator comprises a lead-screw mechanism.

9. The apparatus of claim 1, wherein the container is a paint container and the contents include paint to be mixed.

10. The apparatus of claim 1, wherein at least one operative connection comprises a slip ring connection.

11. The apparatus of claim 1, wherein the controller selectively operates the first motor at a different speed than the second motor during a mixing process.

12. The apparatus of claim 1, wherein the controller selectively operates the first motor at substantially the same speed as the second motor during a mixing process.

13. The apparatus of claim 1, wherein the controller selectively operates the first motor and the second motor at various changing speeds and/or power levels during a mixing process.

14. The apparatus of claim 1, wherein the controller is configured to selectively control at least one of the first motor and the second motor is to selectively operate the first motor and/or the second motor as a brake mechanism.

15. The apparatus of claim 1, wherein the apparatus is substantially free of grease for lubrication of various mechanisms, and wherein the apparatus comprises lubricated engineered plastic for lubrication of at least one component.

16. The apparatus of claim 3, wherein the linear clamping mechanism comprises at least one roller bearing.

17. A multi-axis mixing apparatus, comprising:

a housing;

a rotatable assembly and a rotatable sub-assembly;

a controller operatively connected to and configured to independently operate at least:

a first direct drive electric motor configured to selectively rotate the rotatable assembly about a first axis; and a second direct drive electric motor; and the rotatable assembly supporting and providing an operative connection to the second direct drive electric motor configured to selectively rotate the rotatable sub-assembly about a second axis that is different from the first axis, wherein the rotatable sub-assembly comprises a linear clamping mechanism comprising a first plate, a second plate, and a third motor configured to adjustably position the first plate relative to the second plate, wherein at least one of the first and second plates of the linear clamping mechanism is configured to move linearly to clamp and hold a sealed container containing contents to be mixed, and an extractor mechanism is configured to displace the container relative to the sub-assembly for removal of the container.

18. The apparatus of claim 17, wherein the linear clamping mechanism comprises at least one roller track and at least two sealed bearings connected to a carrier, the carrier configured to move linearly along the roller track such that the linear clamping mechanism operates to move linearly to clamp the container for mixing.

19. A multi-axis mixing apparatus, comprising:

a housing;

a rotatable assembly and a rotatable sub-assembly;

a controller operatively connected to at least a first direct drive electric motor configured to selectively rotate the rotatable assembly; and the rotatable assembly supporting the rotatable sub-assembly, wherein the rotatable sub-assembly comprises a linear clamping mechanism comprising a first plate, a second plate, and a second motor configured to adjustably position the first plate relative to the second plate, wherein at least one of the first and second plates of the linear clamping mechanism is configured to move linearly to clamp and hold a sealed container containing contents to be mixed, and wherein the sub-assembly comprises at least one magnet feature that extends around a perimeter of the first plate, wherein the at least one magnet feature is configured to attract and hold a handle of the container.

20. The apparatus of claim 4, wherein at least one of the first plate and the second plate has at least two indentations in a stepped arrangement for receiving a portion of the container selected from at least two container sizes, and wherein the at least two indentations comprise a smaller indentation configured to receive a smaller container, the smaller indentation being positioned lower and being narrower in diameter, and a larger indentation being larger in diameter and configured to receive a larger container that is positioned higher and wider than the smaller indentation.

* * * * *